United States Patent
Gupta et al.

(10) Patent No.: US 11,775,482 B2
(45) Date of Patent: Oct. 3, 2023

(54) FILE SYSTEM METADATA DEDUPLICATION

(71) Applicant: Cohesity, Inc., San Jose, CA (US)

(72) Inventors: Anubhav Gupta, Sunnyvale, CA (US); Sachin Jain, Fremont, CA (US); Shreyas Talele, Santa Clara, CA (US); Zhihuan Qiu, Santa Clara, CA (US)

(73) Assignee: Cohesity, Inc., San Jose, CA (US)

( * ) Notice: Subject to any disclaimer, the term of this patent is extended or adjusted under 35 U.S.C. 154(b) by 58 days.

(21) Appl. No.: 16/854,153

(22) Filed: Apr. 21, 2020

(65) Prior Publication Data
US 2020/0349115 A1 Nov. 5, 2020

Related U.S. Application Data

(60) Provisional application No. 62/840,614, filed on Apr. 30, 2019.

(51) Int. Cl.
*G06F 16/174* (2019.01)
*G06F 16/901* (2019.01)
*G06F 16/182* (2019.01)
*G06F 16/14* (2019.01)

(52) U.S. Cl.
CPC ............ *G06F 16/174* (2019.01); *G06F 16/14* (2019.01); *G06F 16/184* (2019.01); *G06F 16/9027* (2019.01)

(58) Field of Classification Search
CPC .... G06F 16/174; G06F 16/14; G06F 16/9027; G06F 16/184
See application file for complete search history.

(56) References Cited

U.S. PATENT DOCUMENTS

| 9,235,588 B1 * | 1/2016 | Vaikar ................... G06F 3/0641 |
| 10,133,508 B1 * | 11/2018 | Smaldone ............... G06F 11/14 |
| 2013/0238832 A1 * | 9/2013 | Dronamraju .......... G06F 3/0641 711/103 |
| 2014/0281217 A1 * | 9/2014 | Beam .................... G06F 3/0607 711/114 |
| 2016/0026652 A1 | 1/2016 | Zheng |
| 2016/0034356 A1 | 2/2016 | Aron |
| 2017/0031768 A1 * | 2/2017 | Sarab .................. G06F 11/0727 |
| 2017/0351698 A1 * | 12/2017 | Ioannou ................ G06F 3/0601 |
| 2018/0081821 A1 * | 3/2018 | Beaverson ............ G06F 3/0604 |
| 2018/0364949 A1 * | 12/2018 | Aston .................... G06F 3/067 |

FOREIGN PATENT DOCUMENTS

WO 2018075042 4/2018

OTHER PUBLICATIONS

Thwel et al., "An Efficient Indexing Mechanism for Data Deduplication", Current Trends in Information Technology (CTIT), 2009 International Conference on the, IEEE, Piscataway, NJ, USA, Dec. 15, 2009 (Dec. 15, 2009), pp. 1-5, XP031643752, ISBN: 978-1-4244-5754-0.

* cited by examiner

*Primary Examiner* — Hosain T Alam
*Assistant Examiner* — Anthony G Gemignani
(74) *Attorney, Agent, or Firm* — Van Pelt, Yi & James LLP

(57) ABSTRACT

File metadata structures of a file system are analyzed. At least one metadata element that is duplicated among the analyzed file metadata structures is identified. The at least one identified metadata element is deduplicated including by modifying at least one of the file metadata structures to reference a same instance of the identified metadata element that is referenced by another one of the file metadata structures.

17 Claims, 17 Drawing Sheets

FILE SYSTEM METADATA DEDUPLICATION

CROSS REFERENCE TO OTHER APPLICATIONS

This application claims priority to U.S. Provisional Patent Application No. 62/840,614 entitled FILE SYSTEM METADATA DEDUPLICATION filed Apr. 30, 2019 which is incorporated herein by reference for all purposes.

BACKGROUND OF THE INVENTION

Data associated with files and metadata for the files is often stored in a storage cluster. The data and the metadata may be generated by the storage cluster and/or may be generated as part of a process for backing up files and/or restoring files. File operation requests such as read, write, delete involves accessing data from the storage cluster, and incurs processor clock cycles and access to solid state and/or hard desk memory. It is desirable to store the data as efficiently as possible.

BRIEF DESCRIPTION OF THE DRAWINGS

Various embodiments of the invention are disclosed in the following detailed description and the accompanying drawings.

DETAILED DESCRIPTION

Figure 1:
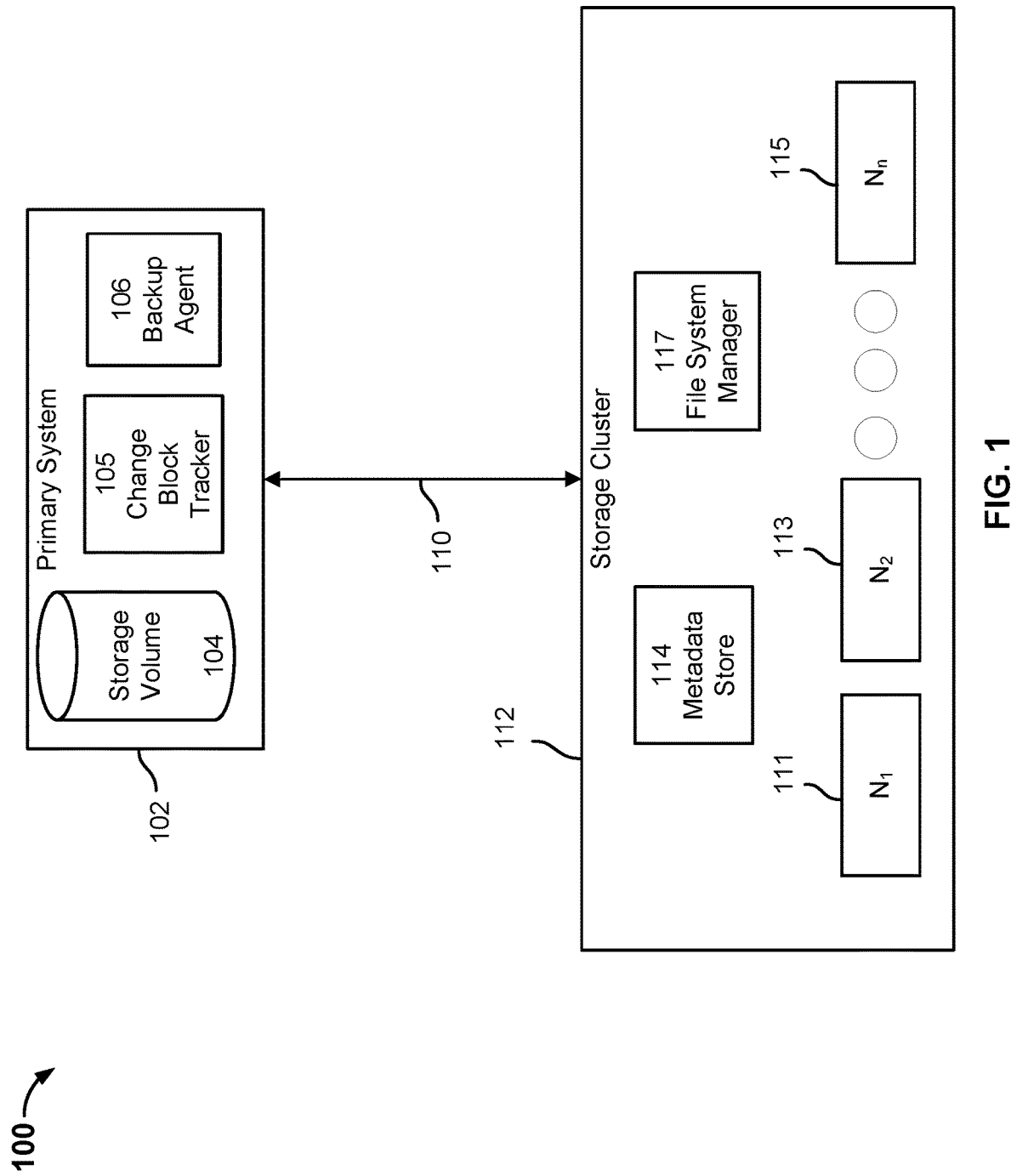
FIG. 1 is a block diagram illustrating a system for file system metadata deduplication in accordance with some embodiments.

A storage cluster may be configured to store a plurality of files. The storage cluster may be configured to back up a plurality of files stored on a primary system. The storage cluster may be configured to store a plurality of files generated on or by the storage cluster (e.g., a system generated file, a user generated file, an application generated file, etc.). Regardless of the file source, the storage cluster may be configured to organize the metadata associated with a file using a tree data structure.

The tree data structure of the metadata associated with a file may be referred to as a "file metadata tree" or "file metadata structure." The tree data structure of the metadata associated with a file may include a root node, one or more levels of one or more intermediate nodes, and a plurality of leaf nodes. Each node of the file metadata structure may be referred to as a "metadata element." A leaf node of a file metadata structure may store a key-value pair (KVP). The value of the KVP may include a brick identifier associated with one or more data chunks of the file. A data brick may be associated with one or more chunk identifiers (e.g., SHA-1 hash value). A chunk file may be configured to store a plurality of data chunks. A chunk metadata table may store information that associates a brick identifier with one or more chunk identifiers and one or more chunk file identifiers. A chunk file metadata table may associate a chunk file identifier with a chunk file storing a plurality of data chunks. The chunk metadata table and the chunk file metadata table may be used, based on a brick identifier, to locate the data chunks associated with the file corresponding to the file metadata structure.

The storage cluster may be comprised of a plurality of storage nodes. Each storage node may include a corresponding processor and a plurality of storage tiers. For example, a first storage tier may be comprised of one or more solid state drives (SSDs) and a second storage tier may be comprised of one or more hard disk drives (HDDs) and a solid-state drive (SSD). The storage associated with the first storage tier may be faster than the storage associated with one or more other storage tiers. The metadata associated with the plurality of files may be stored in the first storage tier, e.g. SSDs, of the storage cluster while the data associated with the plurality of files, in particular the data chunk chunks referred to above, may be stored in either the first or second storage tiers (e.g. SSDs or HDDs) of the storage cluster. A storage cluster may receive one or more file operation requests (e.g., read, write, delete) for data associated with the plurality of files. The metadata associated with the plurality of files is stored in the first storage tier (SSDs) of the storage cluster to enable a processor of the storage cluster handling the request to quickly locate the data associated with a file.

The plurality of files stored in the storage cluster may include duplicated data chunks, which can be deduplicated to reduce the amount of storage used to store the plurality of files. This frees up storage space for the HDDs and SSDs to store data associated with one or more other files. Although this enables data associated with a file and between a file to be deduplicated, the storage cluster may separately store duplicate metadata associated with the plurality of files. For example, a storage cluster may store a plurality of file metadata structures that include corresponding leaf nodes that store the same value, e.g. because they point to the same data brick via the same brick identifier. Such a scenario is inefficient because multiple leaf nodes reference the same data brick. The amount of storage available in the SSDs in particular of the storage cluster is finite, and efficient use of storage for both the SSD and HDD is desirable.

In embodiments disclosed herein, the amount of storage used to store the metadata associated with a plurality of files may be reduced by deduplicating the metadata associated with the plurality of files. In embodiments described herein, one or more duplicate metadata elements, e.g., duplicate leaf nodes, are removed from the SSD. In order to identify potentially duplicate metadata elements, the bottom two levels of the plurality of file metadata structures stored by the storage cluster may be scanned. In this way those leaf nodes that store the same brick identifier can be identified. The bottom two levels of a file metadata structure correspond to what is referred to herein as a leaf node level and a lowest intermediate node level, i.e., the nodes that reference the leaf nodes included in the leaf node level. The leaf nodes that store the same brick identifier may be associated with different files and/or different versions of the same file.

A reference count can be maintained for at least some of the leaf nodes, which indicates a number of other nodes that reference the leaf node, e.g., that include a pointer to the leaf node. A leaf node storing the same value (e.g. brick identifier) as one or more other leaf nodes and having the highest reference count is identified. Of those leaf nodes that store the same value, the node having the highest reference count is selected and retained, and any parent node(s) associated with one or more leaf nodes not having the highest reference count (e.g. an intermediate node included in the lowest intermediate node level) is modified to reference the leaf node having the highest reference count. The one or more leaf nodes not having the highest reference count are then deleted. Retaining the leaf node with the highest reference count may reduce the number of writes needed by the processors of the storage cluster to deduplicate the metadata associated with a plurality of files. For example, two leaf nodes may store the same brick identifier. The first leaf node may have a reference count of four and the second leaf node may have a reference count of one. Modifying the parent node of the second leaf node to reference the first leaf node would require a single write operation whereas modifying the parent nodes of the first leaf node to reference the second leaf node would require four separate write operations.

In other embodiments, one or more duplicate file metadata structure portions are removed. The leaf nodes associated with at least a portion of a file metadata structure may store a particular sequence of values (e.g., brick identifiers). For example, a first file metadata structure may include four leaf nodes where a first leaf node stores a brick identifier of "1," a second leaf node stores a brick identifier of "2," a third leaf node stores a brick identifier of "3," and a fourth leaf node stores a brick identifier of "4." In this example, the particular sequence of values for the first file metadata structure is "1234." The particular sequence of values may be referred to as a "tree fingerprint." A breadth level search of leaf node level of a file metadata structure may be performed to identify the tree fingerprint associated with a file metadata structure. In some embodiments, a portion of the tree fingerprint associated with a first file metadata structure is the same as a portion of the tree fingerprint associated with one or more other file metadata structures.

For example, the tree fingerprint associated with the first file metadata structure may be "1234," the tree fingerprint associated with a second file metadata structure may be "5634," and the tree fingerprint associated with a third file metadata structure may be "8934." The tree fingerprints associated with the first, second, and third file metadata structures share a common sequence of values (e.g., brick identifiers). In this example, the common sequence of values is "34." A so-called common node associated with the common sequence may be identified. A common node may be a node that includes a direct or indirect reference to the leaf nodes associated with the common sequence and does not include a direct or indirect reference to leaf nodes that are not associated with the common sequence. A node may include a direct reference to the leaf nodes associated with the common sequence in the event the node is one level above the leaf nodes associated with the common sequence. A node may include an indirect reference to the leaf nodes associated with the common sequence in the event the node is two or more levels above the leaf nodes associated with the common sequence. For example, an intermediate node associated with a first level of intermediate nodes may include a reference to an intermediate node associated with a second level of intermediate nodes. The intermediate node associated with the second level of intermediate nodes may include a reference to a leaf node. The intermediate node associated with the first level of intermediate nodes includes an indirect reference to the leaf node.

A reference count for each of the common nodes associated with the common sequence may be maintained. The reference count indicates a number of other nodes that reference the common node, e.g., that include a pointer to the common node. The common node having the highest reference count may be identified. Of those common nodes associated with the common sequence, the common node having the highest reference count is selected and retained, and any parent node(s) of the one or more other common nodes not having the highest reference count are modified to reference the common node having the highest reference count. The one or more common nodes not having the highest reference count are deleted, and the one or more nodes directly or indirectly referenced by the one or more common nodes not having the highest reference count are deleted. Retaining the common node with the highest number of references may reduce the number of writes needed by the processors of the storage cluster to deduplicate the metadata associated with a plurality of files. For example, two common nodes may be associated with the same common sequence. The first common node may have a reference count of four and the second common node may have a reference count of one. Modifying the parent node of the second common node to reference the first common node would require a single write operation whereas modifying the parent nodes of the first common node to reference the second common node would require four separate write operations.

The metadata associated with a plurality of files stored by a storage cluster may be deduplicated as a background process of the storage cluster. The metadata deduplication process may be scheduled when the storage cluster has available resources, for example, when the storage cluster is not performing a backup of a primary storage system. The metadata deduplication techniques described herein may allow a storage cluster to reclaim valuable SSD storage while the system resources of the storage cluster are not burdened.

FIG. 1 is a block diagram illustrating a system for file system metadata deduplication in accordance with some embodiments. In the example shown, system 100 includes a primary system 102 and a storage cluster 112.

Primary system 102 is a computing system that stores file system data. The file system data may be stored in storage volume 104. The file system data may be stored across one or more object(s), virtual machine(s), physical entity/entities, file system(s), array backup(s), and/or volume(s) of the primary system 102. The file system data may include one or more files (e.g., content files, text files). Primary system 102 may be comprised of one or more servers, one or more computing devices, one or more storage devices, and/or a combination thereof.

The file system data stored on primary system 102 may be comprised of one or more data blocks. Primary system 102 may be configured to perform agent-based tracking, for example by means of a change block tracker 105, which monitors the one or more data blocks and store an indication of when one of the one or more data blocks has been modified. Change block tracker 105 may receive one or more data blocks associated with one or more files in route to being stored in one or more object(s), virtual machine(s), physical entity/entities, file system(s), array backup(s), and/or volume(s) of primary system 102. A change block tracker may be configured to maintain a map of the one or more changes to the file system data. The map may include the one or more data blocks that were changed, the values associated with the one or more changed data blocks, and an associated timestamp. In the event primary system 102 performs a backup snapshot (either full or incremental), change block tracker 105 is configured to clear (e.g., empty) the map of the one or more data blocks that have been modified. As an alternative to agent-based tracking, changes can be identified via e.g. an API and suitable function calls (so-called "agentless" tracking).

A backup snapshot can be initiated by a backup agent 106 or by means of instructions received, e.g. via an API; once initiated, primary system 102 sends file system data stored in storage volume 104 to storage cluster 112. The backup snapshot may be a full backup snapshot or an incremental backup snapshot. Backup agent 106 may receive from storage cluster 112 a command to perform a backup snapshot. Primary system 102 is coupled to storage cluster 112 via network connection 110. Connection 110 may be a wired connection or a wireless connection.

Storage cluster 112 is a storage system configured to ingest and store file system data received from primary system 102 via connection 110. Storage cluster 112 may be comprised of one or more storage nodes 111, 113, 115. Each storage node may include a corresponding processor and a plurality of storage tiers. For example, as described above, a first storage tier may be comprised of one or more SSDs and a second storage tier may be comprised of one or more HDDs and a SSD. The file system data included in a backup snapshot may be stored in one or more of the storage nodes 111, 113, 115. In some embodiments, the one or more storage nodes store one or more copies of the file system data. In one example, storage cluster 112 is comprised of one solid state drive SSD and three hard disk drives HDD. Storage cluster 112 may receive one or more file operation requests (e.g., read, write, delete) for data associated with the plurality of files. The metadata associated with the plurality of files is stored in the SSDs of the storage cluster to enable a processor of the storage cluster handling the request to quickly locate the data associated with a file.

Storage cluster 112 may include file system manager 117. File system manager 117 may be configured to organize in a tree data structure the file system data received in a backup snapshot from primary system 102. An example of the tree data structure is a file system metadata snapshot tree (e.g., Cohesity Snaptree®), which may be based on a B+ tree structure (or other type of tree structure in other embodiments). The tree data structure provides a view of the file system data corresponding to a backup snapshot. The view of the file system data corresponding to the backup snapshot may be comprised of a file system metadata snapshot tree and a plurality of file metadata structures. A file metadata structure may correspond to one of the files included in the backup snapshot. The file metadata structure stores the metadata associated with the file. File system manager 117 may be configured to perform one or more modifications, as disclosed herein, to a file system metadata snapshot tree and a file metadata structure. The file system metadata snapshot tree and file metadata structures may be stored in metadata store 114. Metadata store 114 may store the view of file system data corresponding to a backup snapshot. Metadata store 114 may also store data associated with content files that are smaller than a limit size (e.g., 256 kB). Metadata store 114 may be across the SSDs of storage nodes 111, 113, 115.

The tree data structure may be used to capture different versions of backup snapshots. The tree data structure allows a chain of file system metadata snapshot trees corresponding to different versions of backup snapshots (i.e., different file system metadata snapshot tree versions) to be linked together by allowing a node of a later version of a file system metadata snapshot tree to reference a node of a previous version of a file system metadata snapshot tree (e.g., a "snapshot tree forest"). For example, a root node or an intermediate node of a second file system metadata snapshot tree corresponding to a second backup snapshot may reference an intermediate node or leaf node of a first file system metadata snapshot tree corresponding to a first backup snapshot.

A file system metadata snapshot tree is a representation of a fully hydrated backup because it provides a complete view of the storage volume(s) at a particular moment in time. A fully hydrated backup is a backup that does not require reconstruction for use. Other systems that do not maintain fully hydrated backups may reconstruct a backup by starting with or restoring a full backup and applying one or more changes associated with one or more incremental backups to the data associated with the full backup. In contrast, with a file system metadata snapshot tree, any file stored in the storage volume at a particular time and the file's contents, for which there is an associated backup, may be determined from the file system metadata snapshot tree, regardless if the associated backup snapshot was a full backup snapshot or an incremental backup snapshot. Creating an incremental backup snapshot may only include copying data of the storage volume(s) that was not previously backed up. The file system metadata snapshot tree corresponding to the incremental backup snapshot provides a complete view of the storage volume(s) at the particular moment in time because it includes references to data of the storage volume that was previously stored. For example, a root node associated with the file system metadata snapshot tree may include one or more references to leaf nodes associated with one or more previous backup snapshots and one or more references to leaf nodes associated with the current backup snapshot. This provides significant savings in the amount of time needed to restore or recover a storage volume and/or a database. In contrast, other recovery/restoration methods may require significant time, storage, and computational resources to reconstruct a particular version of a volume or database from a full backup and a series of incremental backups.

Storage cluster 112 may store a set of one or more file system metadata snapshot trees. Each file system metadata snapshot tree may correspond to a particular moment in time associated with a state of the file system data of primary system 102. A file system metadata snapshot tree may include a root node, one or more levels of one or more intermediate nodes associated with the root node, and one or more leaf nodes associated with an intermediate node of the lowest intermediate level. The root node of a file system metadata snapshot tree may include one or more pointers to one or more intermediate nodes. Each intermediate node may include one or more pointers to other nodes (e.g., a lower intermediate node or a leaf node).

A leaf node may store file system metadata, data associated with a file that is less than a limit size, an identifier of a data brick, a pointer to a data chunk stored on the storage cluster, or a pointer to another file metadata structure. For example, data associated with a file that is smaller than or equal to a limit size (e.g., 256 kB) may be stored in a leaf node of the file system metadata snapshot tree. Alternatively, if the data associated with a file is greater than or equal to the limit size, a leaf node may include a pointer to a mentioned data chunk stored by the storage cluster. As a further alternative, a further file metadata structure may be generated for a file that is larger than the limit size, in which case the leaf node includes a pointer to the further file metadata structure. In both of these latter examples the leaf node can be referred to as an index node (inode).

The file metadata structure may include a root node, one or more levels of one or more intermediate nodes associated with the root node, and one or more leaf nodes associated with an intermediate node of the lowest intermediate level. The file metadata structure is configured to store the metadata associated with a version of a file. The tree data structure associated with a file metadata structure allows a chain of file metadata structures corresponding to different versions of a file to be linked together by allowing a node of a later version of a file metadata structure to reference a node of a previous version of a file metadata structure. For example, a root node or an intermediate node of a second file metadata structure corresponding to a second version of a file may reference an intermediate node or leaf node of a first file metadata structure corresponding to a first version of the file. A file metadata structure may be associated with a plurality of chunk files. A chunk file may be comprised of a plurality of file segment data chunks. Storage cluster 112 may store a set of one or more file metadata structures. Each file metadata structure may correspond to a file. In other embodiments, a file metadata structure corresponds to a portion of a file.

As mentioned above, a leaf node of a file metadata structure may store a value, such as an identifier of a data brick associated with one or more data chunks. For example, as also described above, a file metadata structure may correspond to a file and a leaf node of the file metadata structure may include a pointer to or an identifier of a data brick associated with one or more data chunks of the file. A data brick may be associated with one or more data chunks. In some embodiments, the size of a brick is 256 kB. The one or more data chunks may be of variable length within a particular range (e.g., 4 kB to 64 kB).

The location of the one or more data chunks associated with a data brick may be identified using one or more data structures (e.g., list, table, etc.) stored in metadata store 114. In an embodiment a first data structure (e.g., chunk metadata table) stores information that associates a brick identifier with one or more chunk identifiers and one or more chunk file identifiers. A second data structure (e.g., chunk file metadata table) associates a chunk file identifier with a chunk file storing a plurality of data chunks. In some embodiments, the first data structure and the second data structure are combined as a single data structure. The one or more data chunks associated with a data brick may be located based on the chunk metadata table and the chunk file metadata table. For example, a first data brick having a first brick identifier may be associated with a first chunk identifier e.g., SHA-1 hash value, which is a hash of the content of the relevant chunk file. A chunk file having the identified chunk file identifier may be comprised of a plurality of data chunks, and the chunk file metadata table may be used to identify locations of the plurality of data chunks. For example, the chunk file metadata table may include offset information of the plurality of data chunks within a chunk file.

In some embodiments, storage cluster 112 is configured to back up a plurality of files stored on a primary system and generate a corresponding file metadata structure for each of the plurality of files. In other embodiments, storage cluster 112 is configured to store a plurality of files generated by storage cluster 112 and generate a corresponding file metadata structure for each of the plurality of files. Different versions of a file included in a plurality of backups may be configured to share nodes. As discussed above, a node associated with a later version of a file may reference a node associated with a previous version of the file. In contrast, file metadata structures corresponding to files generated by storage cluster 112 may be independent of each other, i.e., the file metadata structures corresponding to files generated by the storage cluster 112 do not share nodes. In either case, storage cluster 112 may store duplicate metadata elements (e.g., nodes).

As explained above the file metadata structures stored by storage cluster 112 may be stored in the SSDs of storage cluster 112, and the amount of storage available in the SSDs of the storage cluster is finite. Storing duplicate metadata elements is an inefficient use of the SSD. For example, a plurality of file metadata structures may include leaf nodes that store the same value (e.g., reference the same data brick). The amount of storage used by the SSDs of storage cluster 112 to store the metadata associated with a plurality of files may be reduced by deduplicating the metadata associated with a plurality of files.

In some embodiments, one or more duplicate metadata elements (e.g., duplicate leaf nodes) are removed from the SSD. In order to identify potentially duplicate metadata elements storage cluster 112 may identify the one or more duplicate metadata elements in part by scanning the bottom two levels of the plurality of file metadata structures stored by storage cluster 112. As explained above, the bottom two levels of a file metadata structure correspond to a leaf node level and a lowest intermediate node level, i.e., the nodes that reference the leaf nodes included in the leaf node level. Those metadata elements that store the same value (e.g., brick identifier) may be associated with different files and/or different versions of the same file. Storage cluster 112 may then identify the metadata elements, which is to say instances of a metadata element, that store the same value. In some examples, a plurality of file metadata structures corresponding to files included in a backup snapshot received from primary system 102 include metadata elements that store the same value. In other examples, one or more file metadata structures corresponding to files included in a backup snapshot received from primary system 102 and one or more file metadata structures corresponding to files generated by storage cluster 112 include metadata elements that store the same value. In other examples, a plurality of file metadata structures corresponding to files generated by storage cluster 112 may include metadata elements that store the same value.

A reference count is maintained for each metadata element that stores the same value as one or more other metadata elements. The reference count indicates a number of other nodes that reference the metadata element(s), e.g., that include a pointer to the leaf node. For example, a metadata element of a file metadata structure that corresponds to a file included in a backup snapshot may be referenced by nodes included in a plurality of file metadata structures (e.g., different versions of the same file). Conversely a metadata element of a file metadata structure corresponding to a file generated by storage cluster 112 may not be referenced by other file metadata structures because file metadata structures corresponding to files generated by storage cluster 112 are stored independently (i.e., not linked together).

The metadata associated with a plurality of files may be deduplicated in part by determining the metadata elements (e.g., leaf node) storing the same value (e.g., brick identifier) as one or more other metadata elements and having the highest reference count. For the metadata elements that store the same value, the metadata element having the highest reference count is selected and retained, and any parent metadata element associated with metadata elements not having the highest reference count (e.g., a node that includes a pointer to the metadata element not having the highest reference count) is modified to reference the metadata element having the highest reference count. The metadata elements not having the highest reference count are then deleted. Retaining the metadata element with the highest reference count may reduce the number of writes needed by the processors of storage cluster 112 to deduplicate the metadata associated with a plurality of files. In other embodiments, a plurality of metadata elements storing the same value have the same reference count, i.e., there is no single metadata element having the highest reference count. In this case the metadata associated with a plurality of files can be deduplicated by selecting and retaining one of the metadata elements; the parent metadata element associated with one or more non-selected metadata elements can then be modified to reference the selected metadata element, while the one or more non-selected metadata elements are deleted.

In other embodiments, the metadata associated with a plurality of files is deduplicated by removing one or more duplicate portions of file metadata structures from the SSDs of storage cluster 112. The metadata elements associated with at least a portion of a file metadata structure may store a particular sequence of values (e.g., brick identifiers). For example, a file metadata structure may include four leaf nodes where a first leaf node stores a brick identifier of "1," a second leaf node stores a brick identifier of "2," a third leaf node stores a brick identifier of "3," and a fourth leaf node stores a brick identifier of "4." In this example, the particular sequence of values for the file metadata structure is "1234." The particular sequence of values may be referred to as a "tree fingerprint." Storage cluster 112 may perform a breadth level search of the leaf node level for each of the plurality of file metadata structures to identify corresponding tree fingerprints associated with the file metadata structures. In some embodiments, a portion of the tree fingerprint associated with a first file metadata structure is the same as a portion of the tree fingerprint associated with one or more other file metadata structures.

For example, the tree fingerprint associated with a first file metadata structure may be "1234," the tree fingerprint associated with a second file metadata structure may be "5634," and the tree fingerprint associated with a third file metadata structure may be "8934." The tree fingerprints associated with the first, second, and third file metadata structures share a common sequence of values (e.g., brick identifiers). In this example, the common sequence of values is "34." A so-called common metadata element (also referred to as a common node) associated with the common sequence may be identified. A common metadata element may be a node that includes a direct or indirect reference to the leaf nodes associated with the common sequence and does not include a direct or indirect reference to leaf nodes that are not associated with the common sequence. A node may include a direct reference to the leaf nodes associated with the common sequence in the event the node is one level above the leaf nodes associated with the common sequence. A node may include an indirect reference to the leaf nodes associated with the common sequence in the event the node is two or more levels above the leaf nodes associated with the common sequence. The common metadata element may be an intermediate node.

A reference count associated with corresponding common metadata elements may be maintained. The reference count indicates a number of other metadata elements that reference the common metadata element, e.g., that include a pointer to the common node. The common metadata element having the highest reference count may be identified. Of those common metadata elements associated with the common sequence, the common metadata element having the highest reference count is selected and retained, and corresponding parent metadata element(s) of the one or more other common metadata elements are modified to reference the common metadata element having the highest reference count. The one or more non-selected common metadata elements are deleted, and the metadata elements directly or indirectly referenced by the one or more non-selected common metadata elements are deleted. Retaining the common metadata element with the highest number of references may reduce the number of writes needed by the processors of the storage cluster to deduplicate the metadata associated with a plurality of files. In other embodiments, a plurality of common metadata elements have the same reference count, i.e., there is no single common metadata element having the highest reference count. In this case, the metadata associated with a plurality of files can be deduplicated by selecting and retaining one of the common metadata element; the parent metadata element associated with one or more non-selected common metadata elements can then be modified to reference the selected common metadata element, while the metadata elements referenced by the one or more non-selected common metadata elements are deleted.

In some embodiments, a single common metadata element associated with a common sequence of values does not exist because at least one of the common metadata element of a plurality of file metadata structures includes a direct or indirect reference to leaf nodes that are not associated with the common sequence. For example, a first file metadata structure may have a tree fingerprint of "12345678" and a second file metadata structure may have a tree fingerprint of "92345678." The common sequence of values in this example is "2345678." A first portion of the first file metadata structure may be associated with leaf nodes having a sequence of values of "1234" and a second portion of the first file metadata structure may be associated with leaf nodes having a sequence of values of "5678." The first portion of the first file metadata structure may be associated with a first intermediate node and the second portion of the first file metadata structure may be associated with a second intermediate node where the first and second intermediate nodes are associated with different branches of the first file metadata structure. A first portion of the second file metadata structure may be associated with leaf nodes having a sequence of values of "9234" and a second portion of the second file metadata structure may be associated with leaf nodes having a sequence of values of "5678." The first portion of the second file metadata structure may be associated with a first intermediate node and the second portion of the second file metadata structure may be associated with a second intermediate node where the first and second intermediate nodes are associated with different branches of the second file metadata structure.

For such cases the common sequence of values may be divided into a plurality of portions and a corresponding common metadata element for the plurality of portions may be determined. For this example, a common metadata element for the sequence of values of "234" may be determined and a common metadata element for the sequence of values of "5678" may be determined. The metadata associated with the file metadata structures may be deduplicated based on the determined common metadata elements. In the event the determined common metadata elements include one or more references to one or more metadata elements that are not part of the common sequence of values, the metadata associated with the plurality of files may be deduplicated at the leaf node level as described above.

Figure 2A:
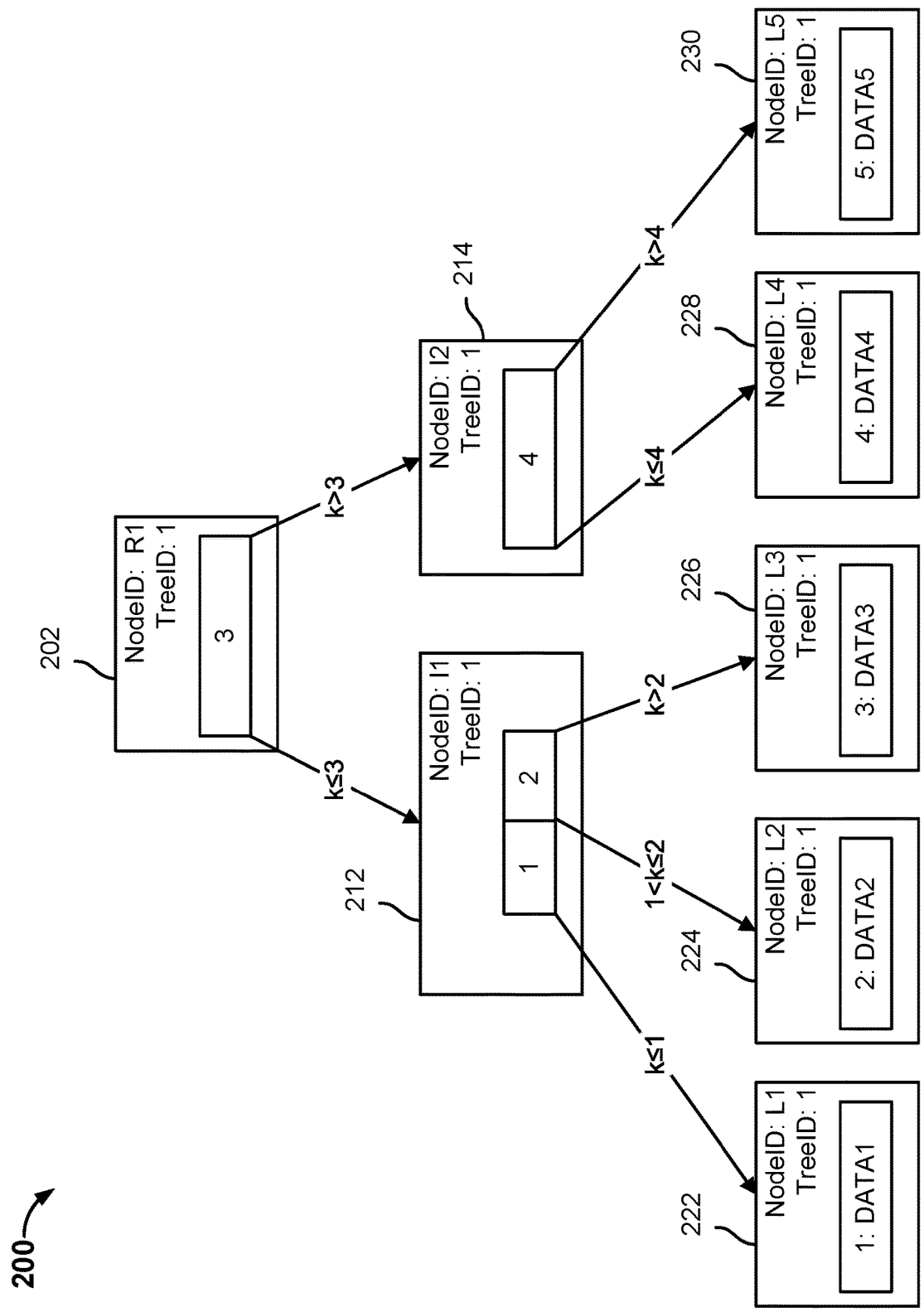
FIG. 2A is a block diagram illustrating an embodiment of a tree data structure.

FIGS. 2A to 2D provide details of exemplary tree data structures, for which embodiments disclosed herein may advantageously be configured to operate. FIG. 2A is a block diagram illustrating an embodiment of a tree data structure, which represents the file system data that is stored on a storage cluster, such as storage cluster 112. The file system data may include metadata for a distributed file system and may include information, such as chunk identifier, chunk offset, file size, directory structure, file permissions, physical storage locations of the files, etc. A file system manager, such as file system manager 117, may generate tree data structure 200.

Tree data structure 200 is comprised of a file system metadata snapshot tree that includes a root node 202, intermediate nodes 212, 214, and leaf nodes 222, 224, 226, 228, and 230. Although tree data structure 200 includes one intermediate level between root node 202 and leaf nodes 222, 224, 226, 228, 230, any number of intermediate levels may be implemented. Tree data structure 200 may correspond to a backup snapshot of file system data at a particular point in time t, for example at time t=1. The backup snapshot may be received at a storage cluster from a primary system. The file system metadata snapshot tree in conjunction with a plurality of file metadata structures may provide a complete view of the primary system for a particular point in time.

A root node is the starting point of a file system metadata snapshot tree and may include pointers to one or more other nodes. An intermediate node is a node to which another node points (e.g., root node, other intermediate node) and includes one or more pointers to one or more other nodes. A leaf node is a node at the bottom level of a file system metadata snapshot tree. Each node of the tree structure includes a view identifier of a view with which the node is associated (e.g., TreeID).

A leaf node may be configured to store key-value pairs of file system data. A data key k is a lookup value by which a particular leaf node may be accessed. For example, "1" is a data key that may be used to lookup "DATA1" of leaf node 222. The data key k may correspond to a brick identifier (e.g., brick number) of a data brick. A data brick may be associated with one or more data chunks. In some embodiments, the leaf node is configured to store file system metadata (e.g., chunk identifier (e.g., hash value, SHA-1, etc.), file size, directory structure, file permissions, physical storage locations of the files, etc.). A leaf node may store a data key k and a pointer to a location that stores the value associated with the data key. In other embodiments, a leaf node is configured to store the actual data when the data associated with a file is less than or equal to a limit size (e.g., 256 kb). As mentioned above, in some examples, a leaf node includes a pointer to a file metadata structure when the size of a file is larger than the limit size.

A root node or an intermediate node may include one or more node keys. The node key may be an integer value or a non-integer value. Each node key indicates a division between the branches of the node and indicates how to traverse the tree structure to find a leaf node, i.e., which pointer to follow. For example, root node 202 may include a node key of "3." A data key k of a key-value pair that is less than or equal to the node key is associated with a first branch of the node and a data key k of a key-value pair that is greater than the node key is associated with a second branch of the node. In the above example, to find a leaf node storing a value associated with a data key of "1," "2," or "3," the first branch of root node 202 would be traversed to intermediate node 212 because the data keys of "1," "2", and "3" are less than or equal to the node key "3." To find a leaf node storing a value associated with a data key of "4" or "5," the second branch of root node 202 would be traversed to intermediate node 214 because data keys "4" and "5" are greater than the node key of "3."

A data key k of a key-value pair is not limited to a numerical value. In some embodiments, non-numerical data keys may be used for a data key-value pair (e.g., "name," "age", etc.) and a numerical number may be associated with the non-numerical data key. For example, a data key of "name" may correspond to a numerical key of "3." Data keys that alphabetically come before the word "name" or is the word "name" may be found following a left branch associated with a node. Data keys that alphabetically come after the word "name" may be found by following a right branch associated with the node. In some embodiments, a hash function may be associated with the non-numerical data key. The hash function may determine which branch of a node with which the non-numerical data key is associated.

In the example shown, root node 202 includes a pointer to intermediate node 212 and a pointer to intermediate node 214. Root node 202 includes a NodeID of "R1" and a TreeID of "1." The NodeID identifies the name of the node. The TreeID identifies the view with which the node is associated. When a change is made to data stored in a leaf node as described with respect to FIGS. 2B, 2C, and 2D, the TreeID is used to determine whether a copy of a node is to be made.

Root node 202 includes a node key that divides a set of pointers into two different subsets. Leaf nodes (e.g., "1-3") with a data key k that is less than or equal to the node key are associated with a first branch and leaf nodes (e.g., "4-5") with a data key k that is greater than the node key are associated with a second branch. Leaf nodes with a data key of "1," "2," or "3" may be found by traversing tree data structure 200 from root node 202 to intermediate node 212 because the data keys have a value that is less than or equal to the node key. Leaf nodes with a data key of "4" or "5" may be found by traversing tree data structure 200 from root node 202 to intermediate node 214 because the data keys have a value that is greater than the node key.

Root node 202 includes a first set of pointers. The first set of pointers associated with a data key less than the node key (e.g., "1", "2," or "3") indicates that traversing tree data structure 200 from root node 202 to intermediate node 212 leads to a leaf node with a data key of "1," "2," or "3." Intermediate node 214 includes a second set of pointers. The second set of pointers associated with a data key greater than the node key indicates that traversing tree data structure 200 from root node 202 to intermediate node 214 leads to a leaf node with a data key of "4" or "5."

Intermediate node 212 includes a pointer to leaf node 222, a pointer to leaf node 224, and a pointer to leaf node 226. Intermediate node 212 includes a NodeID of "I1" and a TreeID of "1." Intermediate node 212 includes a first node key of "1" and a second node key of "2." The data key k for leaf node 222 is a value that is less than or equal to the first node key. The data key k for leaf node 224 is a value that is greater than the first node key and less than or equal to the second node key. The data key k for leaf node 226 is a value that is greater than the second node key. The pointer to leaf node 222 indicates that traversing tree data structure 200 from intermediate node 212 to leaf node 222 leads to the node with a data key of "1." The pointer to leaf node 224 indicates that traversing tree data structure 200 from intermediate node 212 to leaf node 224 leads to the node with a data key of "2." The pointer to leaf node 226 indicates that traversing tree data structure 200 from intermediate node 212 to leaf node 226 leads to the node with a data key of "3."

Intermediate node 214 includes a pointer to leaf node 228 and a pointer to leaf node 230. Intermediate node 212 includes a NodeID of "I2" and a TreeID of "1." Intermediate node 214 includes a node key of "4." The data key k for leaf node 228 is a value that is less than or equal to the node key. The data key k for leaf node 230 is a value that is greater than the node key. The pointer to leaf node 228 indicates that traversing tree data structure 200 from intermediate node 214 to leaf node 228 leads to the node with a data key of "4." The pointer to leaf node 230 indicates that traversing tree data structure 200 from intermediate node 214 to leaf node 230 leads the node with a data key of "5."

Leaf nodes 222, 224, 226, 228, 230 include data key-value pairs of "1: DATA1," "2: DATA2," "3: DATA3," "4: DATA4," "5: DATA5," respectively. Leaf nodes 222, 224, 226, 228, 230 include a NodeID of "L1," "L2," "L3," "L4," "L5," respectively. Each of the leaf nodes 222, 224, 226, 228, 230 include a TreeID of "1." To view the value associated with a data key of "1," tree data structure 200 is traversed from root node 202 to intermediate node 212 to leaf node 222. To view the value associated with a data key of "2," tree data structure 200 is traversed from root node 202 to intermediate node 212 to leaf node 224. To view the value associated with a data key of "3," tree data structure 200 is traversed from root node 202 to intermediate node 212 to leaf node 226. To view the value associated with a data key of "4," tree data structure 200 is traversed from root node 202 to intermediate node 214 to leaf node 228. To view the value associated with a data key of "5," tree data structure 200 is traversed from root node 202 to intermediate node 214 to leaf node 230. In some examples, leaf node 222, 224, 226, 228, 230 are configured to store metadata associated with a file. In other examples, leaf node 222, 224, 226, 228, 230 are configured to store a pointer to a file metadata structure.

Figure 2B:
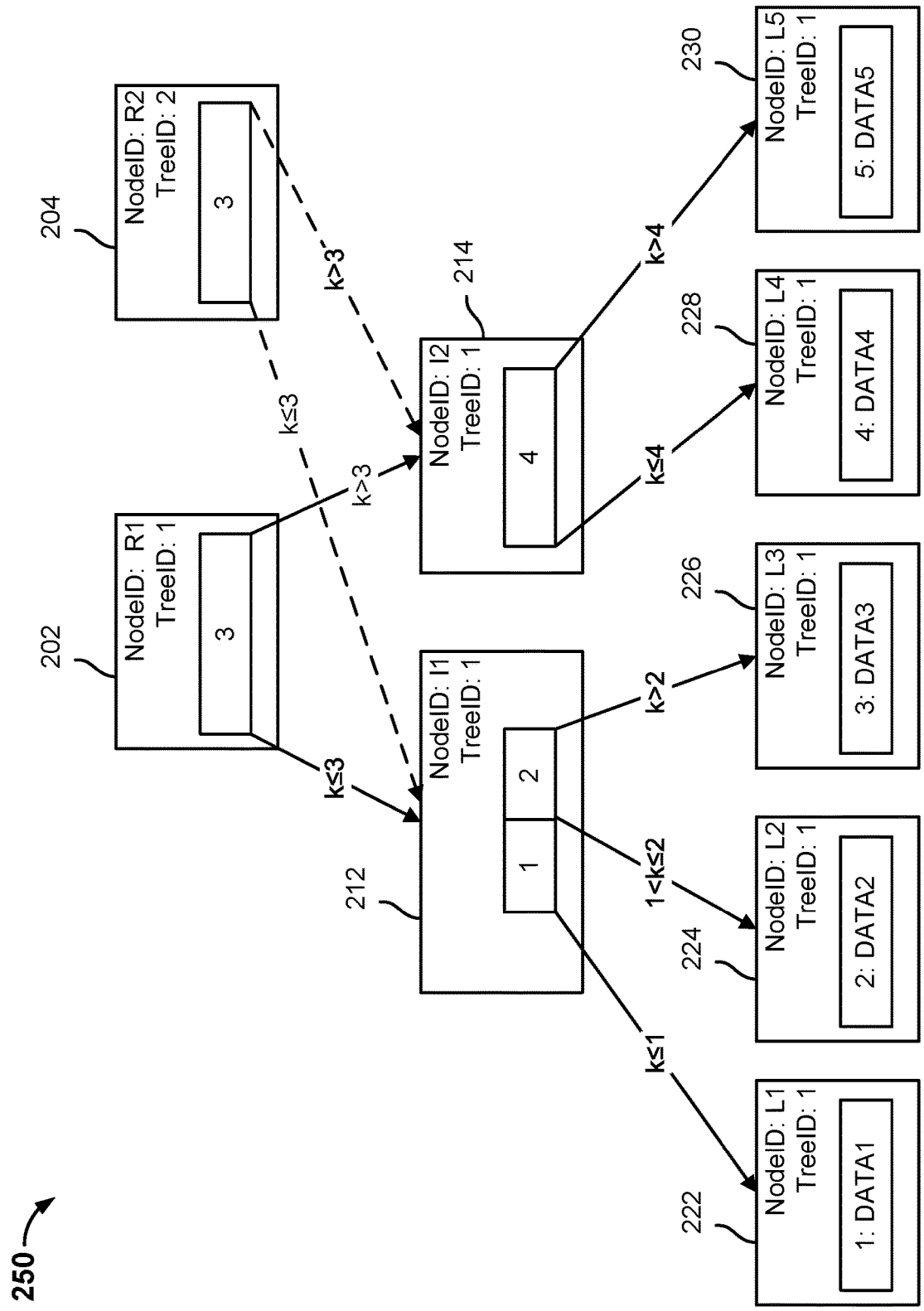
FIG. 2B is a block diagram illustrating an embodiment of a cloned file system metadata snapshot tree.

FIG. 2B is a block diagram illustrating an embodiment of a cloned file system metadata snapshot tree. A file system metadata snapshot tree may be cloned when a file system metadata snapshot tree is added to a tree data structure. In some embodiments, tree data structure 250 may be created by a storage system, such as storage cluster 112. The file system data of a primary system, such as primary system 102, may be backed up to a storage cluster, such as storage cluster 112. A subsequent backup snapshot may correspond to a full backup snapshot or an incremental backup snapshot. The manner in which the file system data corresponding to the subsequent backup snapshot is stored in storage cluster may be represented by a tree data structure. The tree data structure corresponding to the subsequent backup snapshot is created by cloning a file system metadata snapshot tree associated with a last backup snapshot.

In the example shown, tree data structure 250 includes root nodes 202, 204, intermediate nodes 212, 214, and leaf nodes 222, 224, 226, 228, and 230. Tree data structure 250 may be a snapshot of file system data at a particular point in time, such as t=2. The tree data structure can be used to capture different versions of file system data at different moments in time. The tree data structure may allow a chain of backup snapshot versions (i.e., file system metadata snapshot trees) to be linked together by allowing a node of a later version of a file system metadata snapshot tree to reference a node of a previous version of a file system metadata snapshot tree. For example, a file system metadata snapshot tree with root node 204 is linked to a file system metadata snapshot tree with root node 202. Each time a backup snapshot is performed, a new root node may be created and the new root node includes the same set of pointers included in the previous root node, that is the new root node of the file system metadata snapshot tree may be linked to one or more intermediate nodes associated with a previous file system metadata snapshot tree. The new root node also includes a different NodeID and a different TreeID. The TreeID is the view identifier associated with a view of the primary system corresponding to the particular moment in time.

In some embodiments, a root node is associated with a current view of the file system data. A current view may still accept one or more changes to the data. The TreeID of a root node indicates a backup snapshot with which the root node is associated. For example, root node 202 with a TreeID of "1" is associated with a first backup snapshot and root node 204 with a TreeID of "2" is associated with a second backup snapshot. In the example shown, root node 204 is associated with a current view of the file system data.

In other embodiments, a root node is associated with a snapshot view of the file system data. A snapshot view may represent a state of the file system data at a particular moment in time in the past and is not updated. In the example shown, root node 202 is associated with a snapshot view of the file system data.

In the example shown, root node 204 is a clone (e.g., a copy) of root node 202. Similar to root node 202, root node 204 includes the same pointers as root node 202. Root node 204 includes a first set of pointers to intermediate node 212. Root node 204 includes a NodeID of "R2" and a TreeID of "2."

Figure 2C:
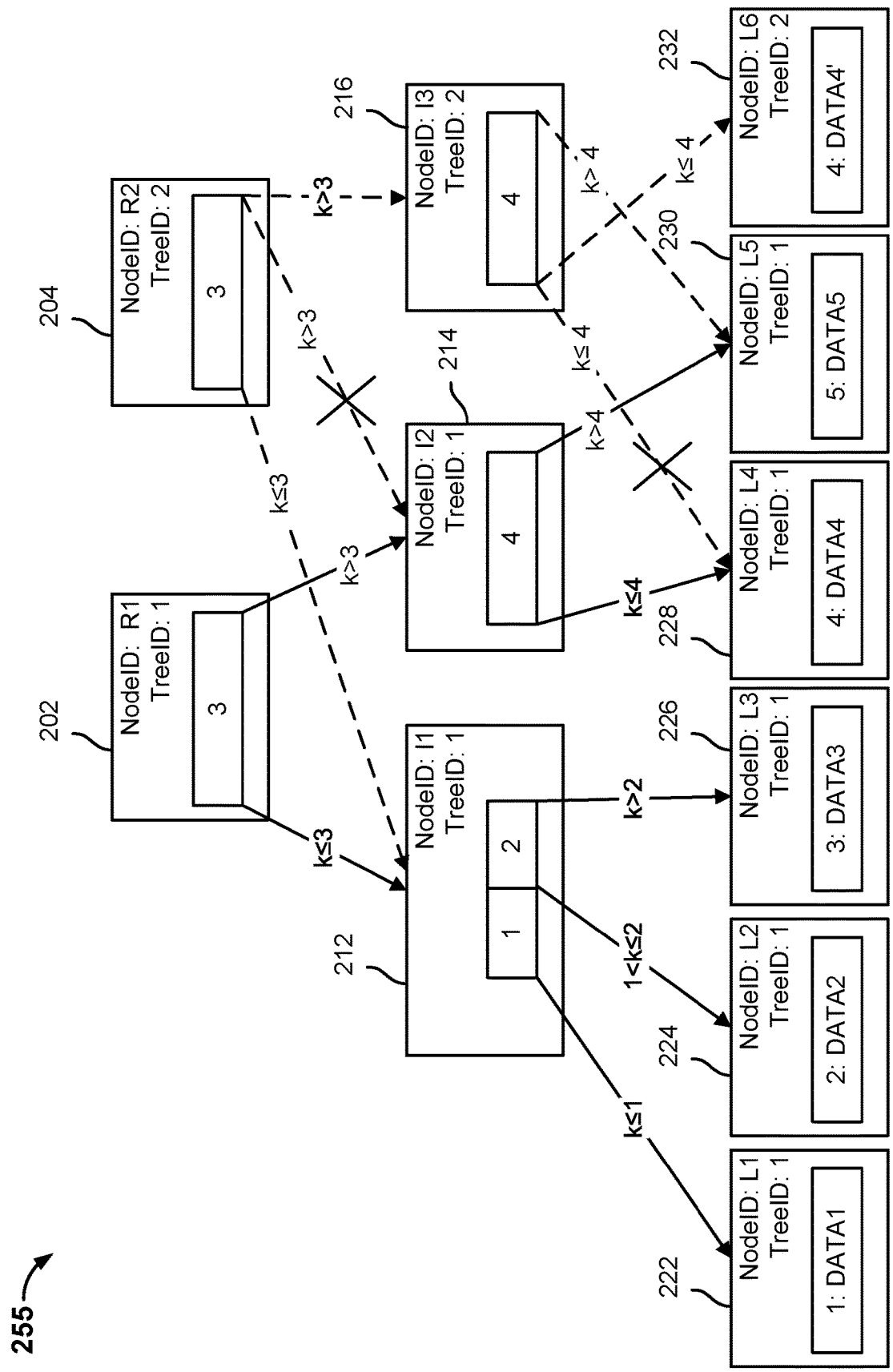
FIG. 2C is a block diagram illustrating an embodiment of modifying a file system metadata snapshot tree.

FIG. 2C is a block diagram illustrating an embodiment of modifying a file system metadata snapshot tree. In the example shown, tree data structure 255 may be modified by a file system manager, such as file system manager 117. A file system metadata snapshot tree with a root node 204 may be a current view of the file system data at time t=2. A current view represents a state of the file system data that is up-to-date and capable of receiving one or more modifications to the snapshot tree that correspond to modifications to the file system data. Because a snapshot represents a perspective of the file system data that is "frozen" in time, one or more copies of one or more nodes affected by a change to file system data, are made.

In the example shown, the value "DATA4" has been modified to be "DATA4'." In some embodiments, the value of a key value pair has been modified. For example, the value of "DATA4" may be a pointer to a file metadata structure corresponding to a first version of a file and the value of "DATA4'" may be a pointer to a file metadata structure corresponding to the second version of the file. In other embodiments, the value of the key pair is the data associated with a content file that is smaller than or equal to a limit size. In other embodiments, the value of the key value pair points to a different file metadata structure. The different file metadata structure may be a modified version of the file metadata structure to which the leaf node previously pointed.

To modify a file system metadata snapshot tree, the file system manager may start at root node 204 because that is the root node associated with the file system metadata snapshot tree at time t=2 (i.e., the root node associated with the last backup snapshot). The value "DATA4" is associated with the data key "4." The file system manager may traverse tree data structure 255 from root node 204 until it reaches a target node, in this example, leaf node 228. The file system manager may compare the TreeID at each intermediate node and leaf node with the TreeID of the root node. In the event the TreeID of a node matches the TreeID of the root node, the file system manager may proceed to the next node. In the event the TreeID of a node does not match the TreeID of the root node, a shadow copy of the node with the non-matching TreeID may be made. A shadow copy is a copy of a node and includes the same pointers as the copied node, but includes a different NodeID and TreeID. For example, to reach a leaf node with a data key of "4," the file system manager begins at root node 204 and proceeds to intermediate node 214. The file system manager compares the TreeID of intermediate node 214 with the TreeID of root node 204, determines that the TreeID of intermediate node 214 does not match the TreeID of root node 204, and creates a copy of intermediate node 214. The intermediate node copy 216 includes the same set of pointers as intermediate node 214, but includes a TreeID of "2" to match the TreeID of root node 204. The file system manager may update a pointer of root node 204 to point to intermediate node 216 instead of pointing to intermediate node 214. The file system manager may traverse tree data structure 255 from intermediate node 216 to leaf node 228, determine that the TreeID of leaf node 228 does not match the TreeID of root node 204, and create a copy of leaf node 228. Leaf node copy 232 stores the modified value "DATA4'" and includes the same TreeID as root node 204. The file system manager may update a pointer of intermediate node 216 to point to leaf node 232 instead of pointing to leaf node 228.

In some embodiments, leaf node 232 stores the value of a key value pair that has been modified. In other embodiments, leaf node 232 stores the modified data associated with a file that is smaller than or equal to a limit size. In other embodiments, leaf node 232 stores a pointer to a file metadata structure corresponding to a file, such as a virtual machine container file.

Figure 2D:
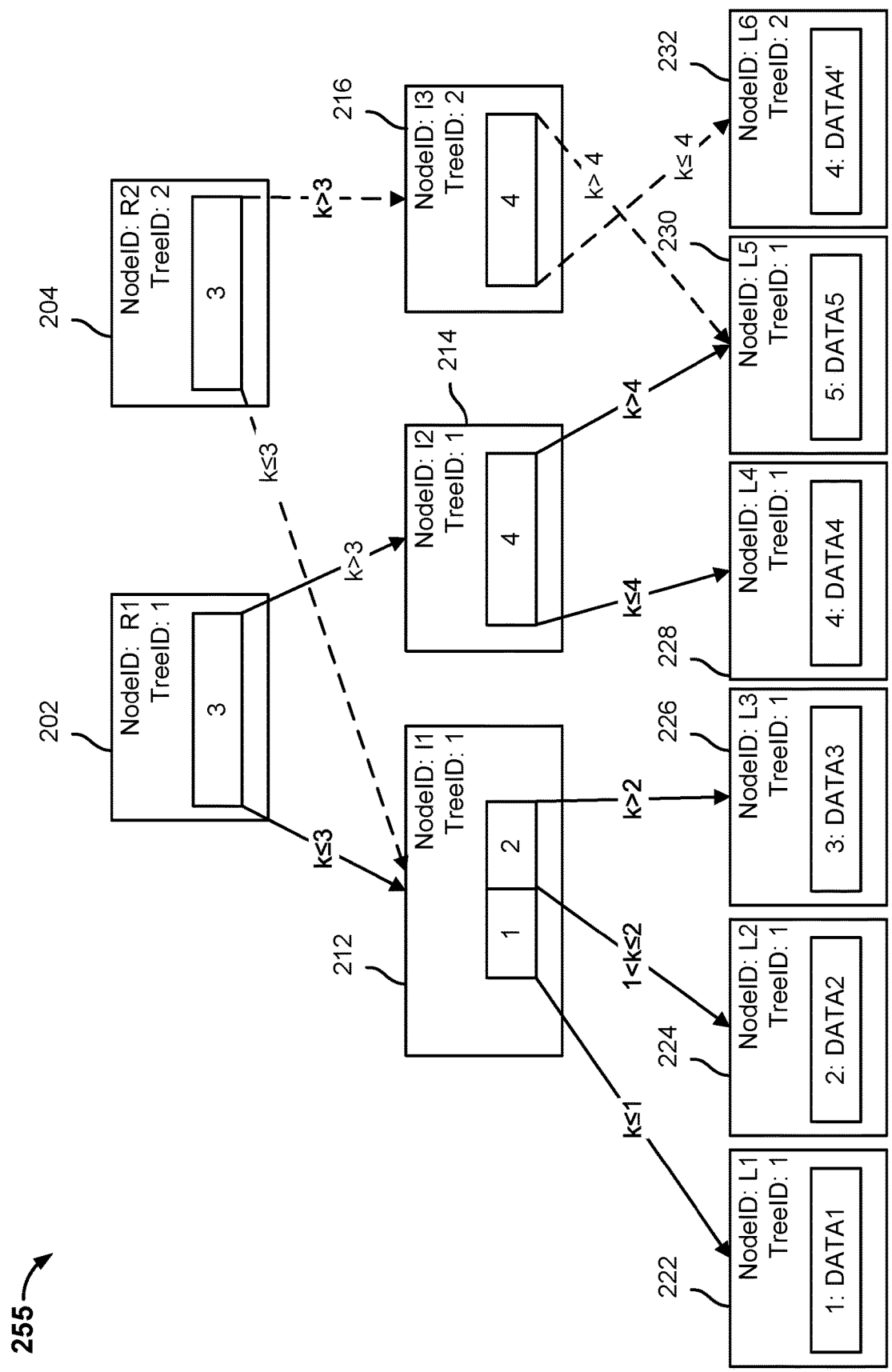
FIG. 2D is a block diagram illustrating an embodiment of a modified snapshot tree.

FIG. 2D is a block diagram illustrating an embodiment of a modified file system metadata snapshot tree. Tree data structure 255 shown in FIG. 2D illustrates a result of the modifications made to a snapshot tree as described with respect to FIG. 2C.

Figure 3A:
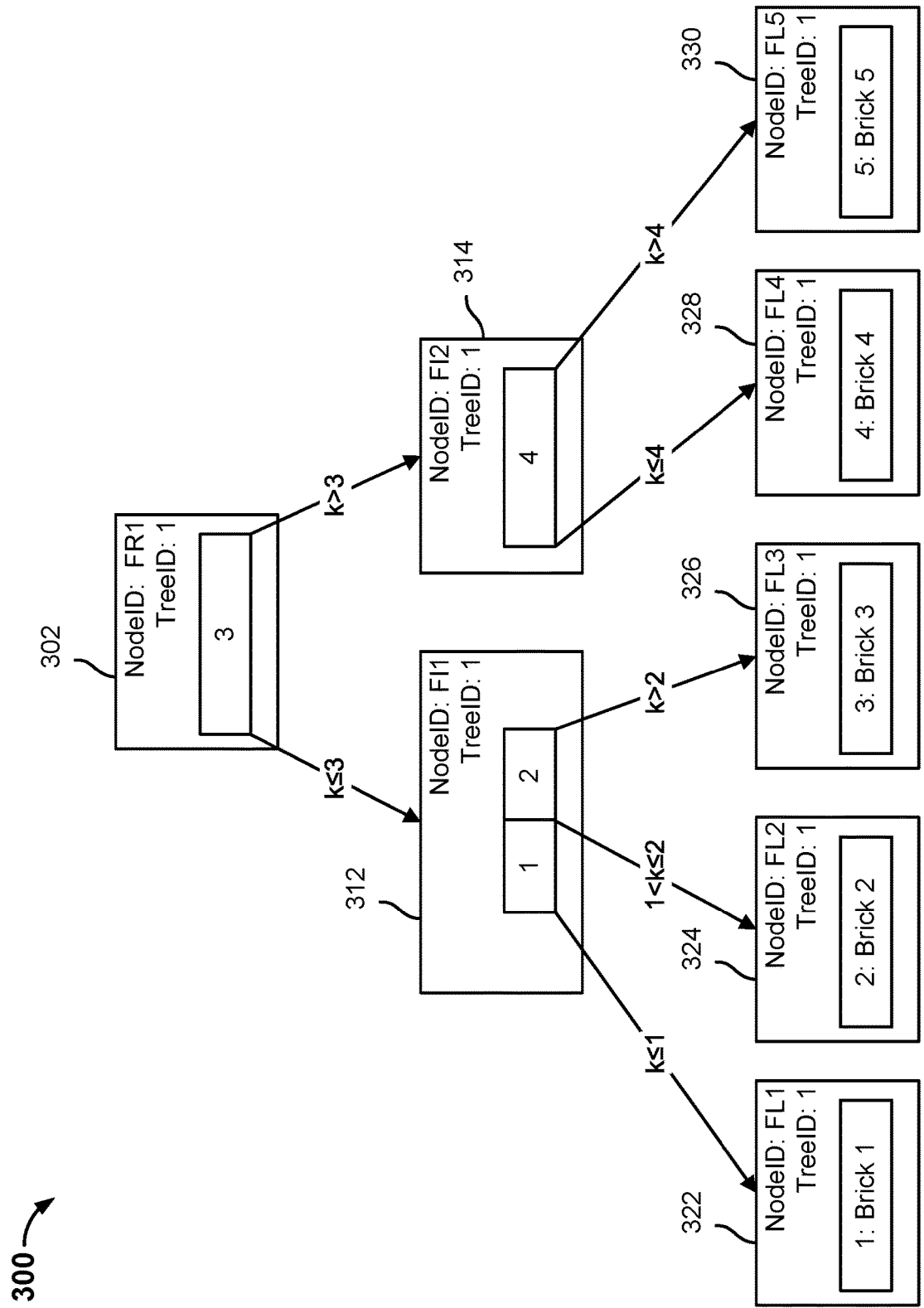
FIG. 3A is a block diagram illustrating an embodiment of a tree data structure.

FIG. 3A is a block diagram illustrating an embodiment of a tree data structure, which corresponds closely to FIG. 2A.

A leaf node of a file system metadata snapshot tree, such as a leaf node of tree data structures 200, 250, 255, may include a pointer to a tree data structure corresponding to a file, such as tree data structure 300.

A tree data structure corresponding to a content file at a particular point in time (e.g., a particular version) may be comprised of a root node, one or more levels of one or more intermediate nodes, and one or more leaf nodes. In some embodiments, a tree data structure corresponding to a content file is comprised of a root node and one or more leaf nodes without any intermediate nodes. Tree data structure 300 may be a snapshot of a content file at a particular point in time t, for example at time t=1.

In the example shown, tree data structure 300 includes a file root node 302, file intermediate nodes 312, 314, and file leaf nodes 322, 324, 326, 328, 330. Although tree data structure 300 includes one intermediate level between root node 302 and leaf nodes 322, 324, 326, 328, 330, any number of intermediate levels may be implemented. Similar of the file system metadata snapshot trees described above, each node includes a "NodeID" that identifies the node and a "TreeID" that identifies a snapshot/view with which the node is associated.

In the example shown, root node 302 includes a pointer to intermediate node 312 and a pointer to intermediate node 314. Root node 202 includes a NodeID of "FR1" and a TreeID of "1."

In the example shown, intermediate node 312 includes a pointer to leaf node 322, a pointer to leaf node 324, and a pointer to leaf node 326. Intermediate node 312 includes a NodeID of "FI1" and a TreeID of "1." Intermediate node 312 includes a first node key and a second node key. The data key k for leaf node 322 is a value that is less than or equal to the first node key. The data key for leaf node 324 is a value that is greater than the first node key and less than or equal to the second node key. The data key for leaf node 326 is a value that is greater than the second node key. The pointer to leaf node 322 indicates that traversing tree data structure 300 from intermediate node 312 to leaf node 322 leads to the node with a data key of "1." The pointer to leaf node 324 indicates that traversing tree data structure 300 from intermediate node 312 to leaf node 324 leads to the node with a data key of "2." The pointer to leaf node 326 indicates that traversing tree data structure 300 from intermediate node 312 to leaf node 326 leads to the node with a data key of "3."

In the example shown, intermediate node 314 includes a pointer to leaf node 328 and a pointer to leaf node 330. Intermediate node 314 includes a NodeID of "FI2" and a TreeID of "1." Intermediate node 314 includes a node key. The data key k for leaf node 328 is a value that is less than or equal to the node key. The data key for leaf node 330 is a value that is greater than the node key. The pointer to leaf node 328 indicates that traversing tree data structure 300 from intermediate node 314 to leaf node 328 leads to the node with a data key of "4." The pointer to leaf node 330 indicates that traversing tree data structure 300 from intermediate node 314 to leaf node 330 leads the node with a data key of "5."

Leaf node 322 includes a data key-value pair of "1: Brick 1." "Brick 1" is a brick identifier that identifies the data brick associated with one or more data chunks of a content file corresponding to tree data structure 300. Leaf node 322 includes NodeID of "FL1" and a TreeID of "1." To view the value associated with a data key of "1," tree data structure 300 is traversed from root node 302 to intermediate node 312 to leaf node 322.

Leaf node 324 includes a data key-value pair of "2: Brick 2." "Brick 2" may be associated with one or more data chunks associated with a content file. Leaf node 324 includes NodeID of "FL2" and a TreeID of "1." To view the value associated with a data key of "2," tree data structure 300 is traversed from root node 302 to intermediate node 312 to leaf node 324.

Leaf node 326 includes a data key-value pair of "3: Brick 3." "Brick 3" may be associated with one or more data chunks associated with a content file. Leaf node 326 includes NodeID of "FL3" and a TreeID of "1." To view the value associated with a data key of "3," tree data structure 300 is traversed from root node 302 to intermediate node 312 to leaf node 326.

Leaf node 328 includes a data key-value pair of "4: Brick 4." "Brick 4" may be associated with one or more data chunks associated with a content file. Leaf node 328 includes NodeID of "FL4" and a TreeID of "1." To view the value associated with a data key of "4," tree data structure 300 is traversed from root node 302 to intermediate node 314 to leaf node 328.

Leaf node 330 includes a data key-value pair of "5: Brick 5." "Brick 5" may be associated with one or more data chunks associated with a content file. Leaf node 330 includes NodeID of "FL5" and a TreeID of "1." To view the value associated with a data key of "5," tree data structure 300 is traversed from root node 302 to intermediate node 314 to leaf node 330.

A content file may be comprised of a plurality of data chunks and one or more chunk files. A data brick may be associated with one or more chunk identifiers (e.g., SHA-1 hash value). In the example shown, leaf nodes 322, 324, 326, 328, 330 each store a corresponding brick identifier. A chunk metadata table may store information that associates a brick identifier with one or more chunk identifiers and one or more chunk file identifiers corresponding to the one or more chunk identifiers. A chunk file metadata table may associate a chunk file identifier with a chunk file storing a plurality of data chunks. The chunk metadata table and the chunk file metadata table may be used, based on a brick identifier, to locate the data chunks associated with the file corresponding to the file metadata structure.

Figure 3B:
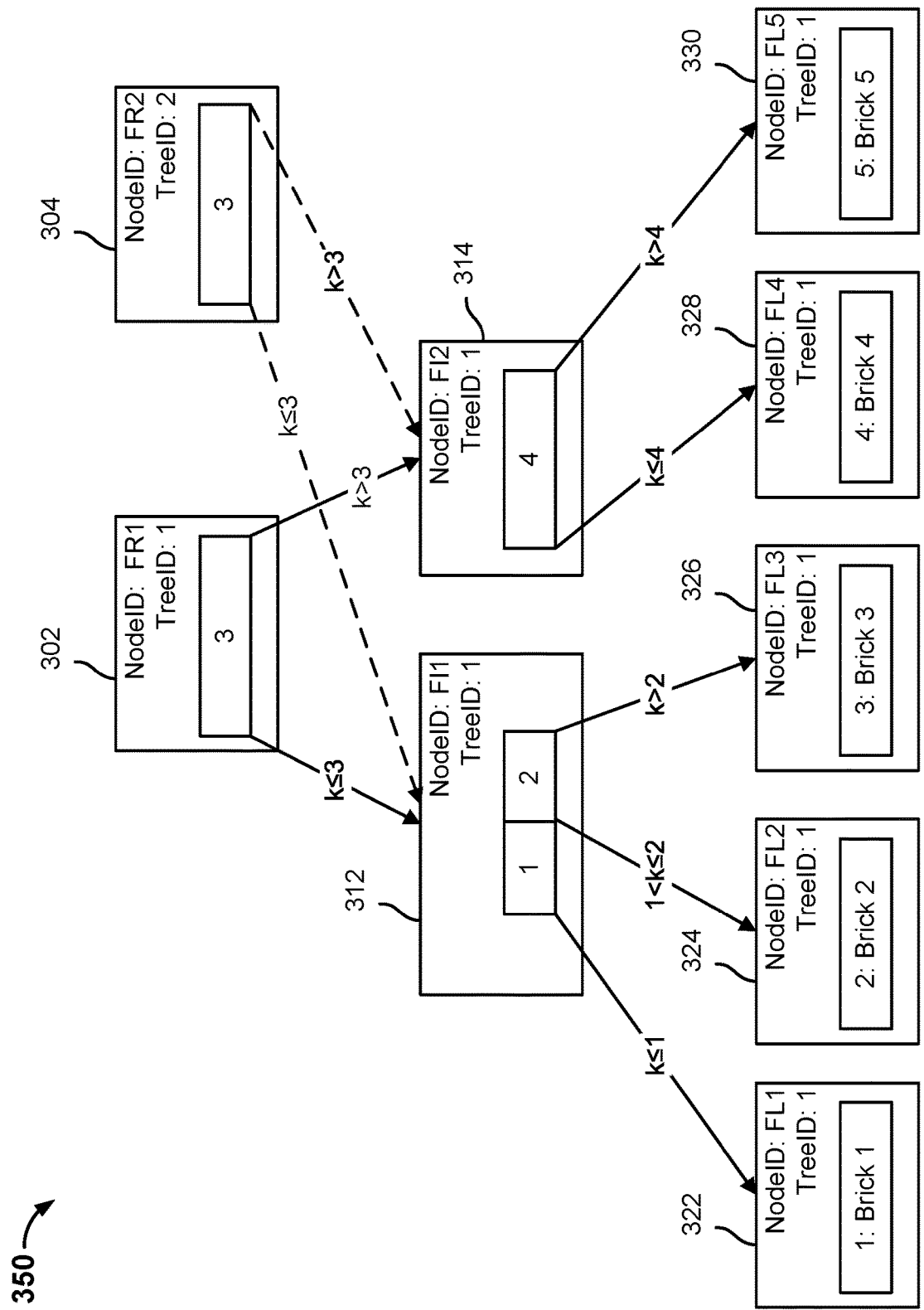
FIG. 3B is a block diagram illustrating an embodiment of adding a file metadata structure to a tree data structure.

FIG. 3B is a block diagram illustrating an embodiment of adding a file metadata structure to a tree data structure. In some embodiments, tree data structure 350 may be created by a storage system, such as storage cluster 104. The tree data structure corresponding to a file can be used to capture different versions of the file at different moments in time. When a backup snapshot is received, a root node of the file metadata structure may be linked to one or more intermediate nodes associated with a previous file metadata structure. This may occur when data associated with the file is included in both backup snapshots.

In the example shown, tree data structure 350 includes a first file metadata structure comprising root node 302, intermediate nodes 312, 314, and leaf nodes 322, 324, 326, 328, and 330 and a second file metadata structure comprised of root node 304, intermediate nodes 312, 314, and leaf nodes 322, 324, 326, 328, and 330. The second file metadata structure may correspond to a version of a file at a particular point in time, for example at time t=2. The first file metadata structure may correspond to a first version of a content file and the second file metadata structure may correspond to a second version of the content file.

To create a snapshot of the file data at time t=2, a new root node is created. The new root node may be clone of the original node and include the same set of pointers as the original node, but includes a different NodeID and a different TreeID. In the example shown, root node 304 includes a set of pointers to intermediate nodes 312, 314, which are intermediate nodes associated with a previous snapshot. In the example shown, root node 304 is a copy of root node 302. Similar to root node 302, root node 304 includes the same pointers as root node 302. Root node 304 includes a NodeID of "FR2" and a TreeID of "2."

Figure 3C:
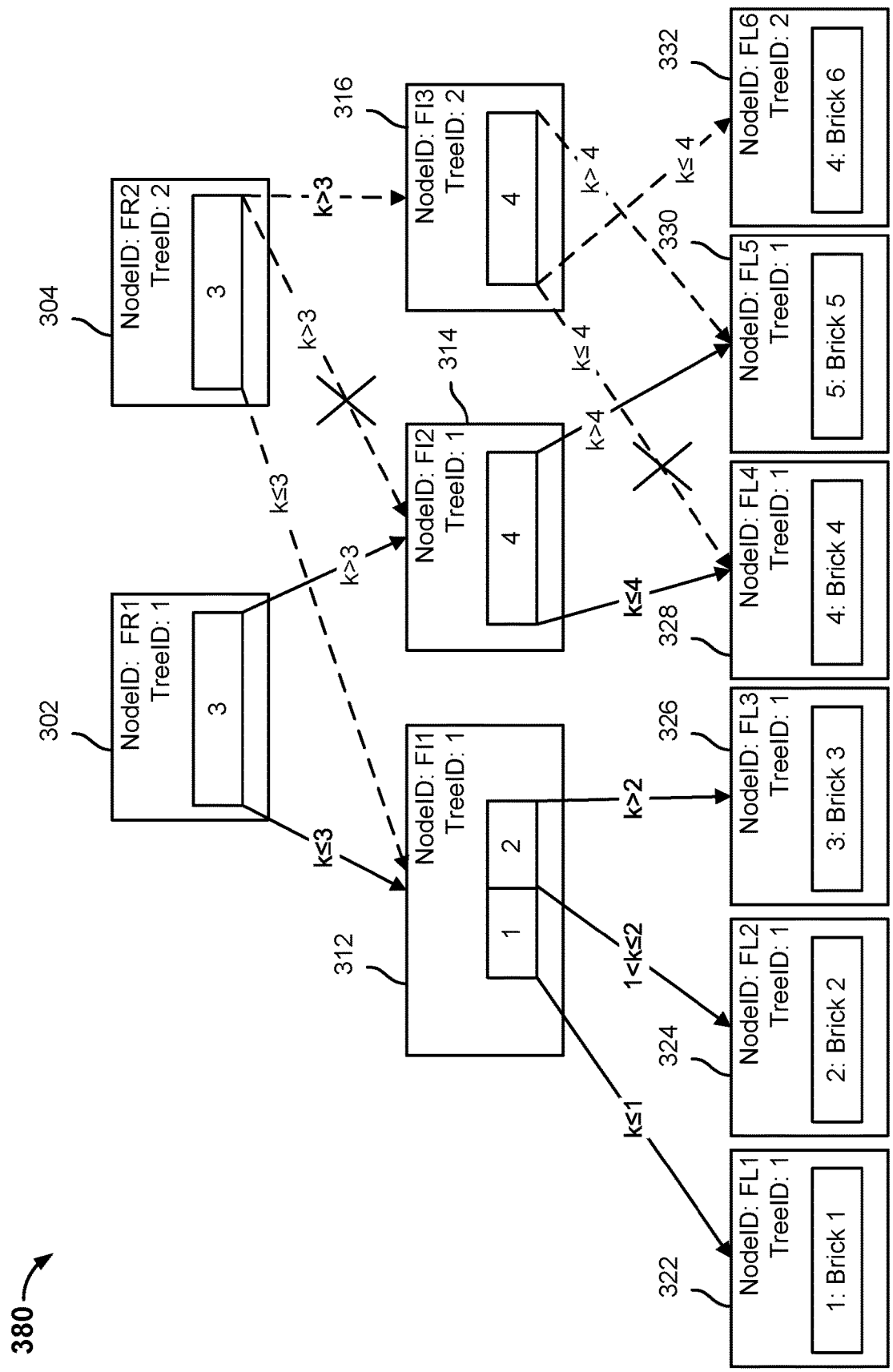
FIG. 3C is a block diagram illustrating an embodiment of modifying a file metadata structure.

FIG. 3C is a block diagram illustrating an embodiment of modifying a file metadata structure. In the example shown, tree data structure 380 may be modified by a file system manager, such as file system manager 117. A file metadata structure with root node 304 may be a current view of the file data at time, for example, at time t=2.

In some embodiments, the file data of a content file may be modified such that one of the data chunks is replaced by another data chunk. When a data chunk of file data associated with a previous backup snapshot is replaced with a new data chunk, the data brick associated with the new data chunk may be different. A leaf node of a file metadata structure may be configured to store a brick identifier of a brick associated with the new data chunk. To represent this modification to the file data, a corresponding modification is made to a current view of a file metadata structure. The data chunk of the file data that was replaced has a corresponding leaf node in the previous file metadata structure. A new leaf node that corresponds to the new data chunk may be created, as described herein, in the current view of the file metadata structure. The new leaf node may include an identifier associated with the current view. The new leaf node may also store the chunk identifier associated with the modified data chunk.

In the example shown, the data chunks of the content file corresponding to "Brick 4" has been modified to be the data chunks associated with "Brick 6." At t=2, the file system manager starts at root node 304 because that is the root node associated with the file metadata structure at time t=2. The value "Brick 4" is associated with the data key "4." The file system manager may traverse tree data structure 380 from root node 304 until it reaches a target node, in this example, leaf node 328. The file system manager may compare the TreeID at each intermediate node and leaf node with the TreeID of the root node. In the event the TreeID of a node matches the TreeID of the root node, the file system manager may proceed to the next node. In the event the TreeID of a node does not match the TreeID of the root node, a shadow copy of the node with the non-matching TreeID may be made. For example, to reach a leaf node with a data key of "4," the file system manager may begin at root node 304 and proceed to intermediate node 314. The file system manager may compare the TreeID of intermediate node 314 with the TreeID of root node 304, determine that the TreeID of intermediate node 314 does not match the TreeID of root node 304, and create a copy of intermediate node 314. The intermediate node copy 316 may include the same set of pointers as intermediate node 314, but include a TreeID of "2" to match the TreeID of root node 304. The file system manager may update a pointer of root node 304 to point to intermediate node 316 instead of pointing to intermediate node 314. The file system manager may traverse tree data structure 380 from intermediate node 316 to leaf node 328, determine that the TreeID of leaf node 328 does not match the TreeID of root node 304, and create a copy of leaf node 328. Leaf node 332 is a copy of leaf node 328, but stores the brick identifier "Brick 6" and includes the same TreeID as root node 304. The file system manager updates a pointer of intermediate node 316 to point to leaf node 332 instead of pointing to leaf node 328.

Figure 3D:
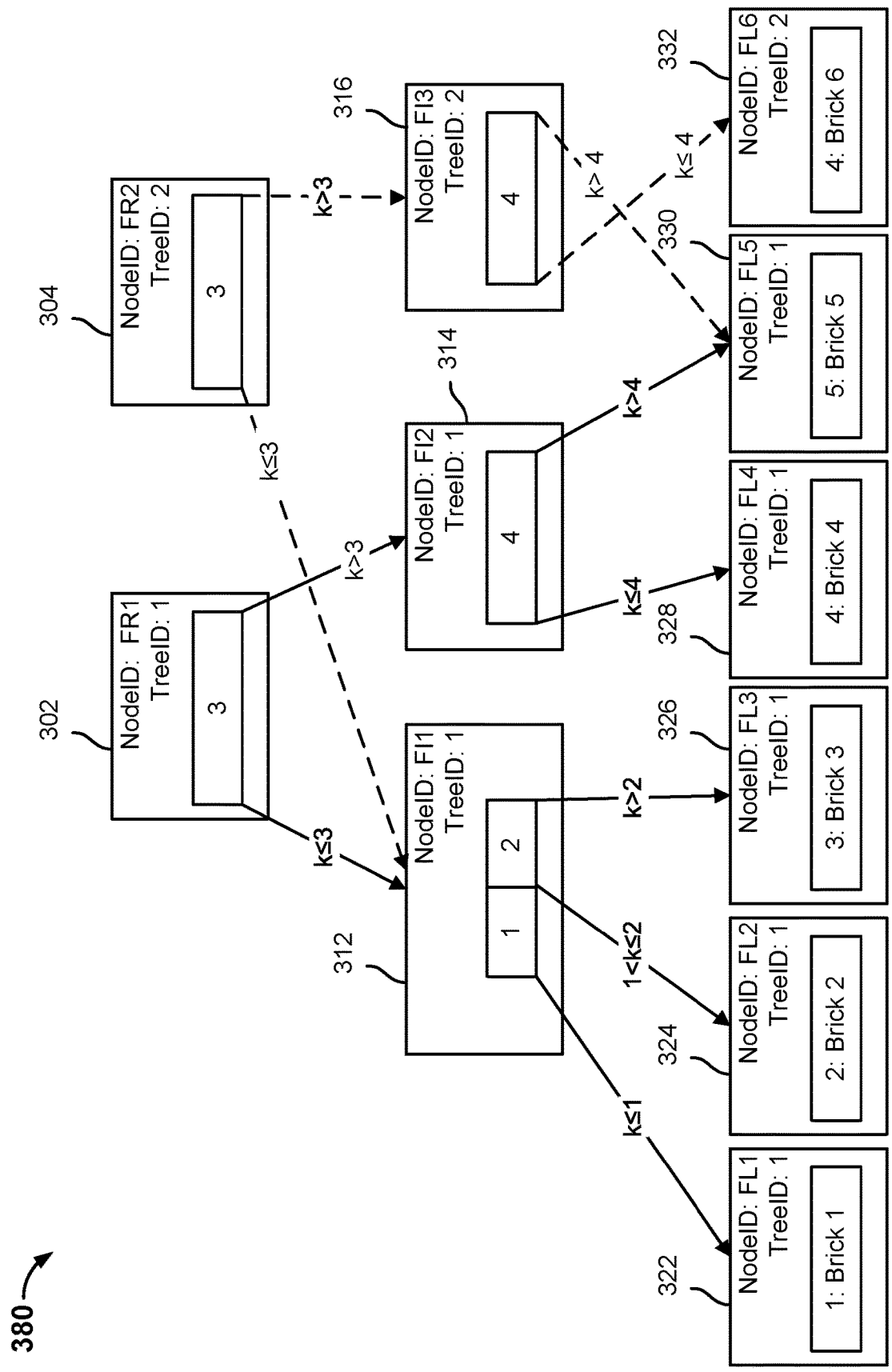
FIG. 3D is a block diagram illustrating an embodiment of a modified file metadata structure.

FIG. 3D is a block diagram illustrating an embodiment of a modified file metadata structure. The tree data structure 380 shown in FIG. 3D illustrates a result of the modifications made to tree data structure 380 as described with respect to FIG. 3C. Each leaf node may have an associated reference count. The reference count may indicate a number of other nodes that reference the leaf node, e.g., include a pointer to the leaf node. In the example shown, leaf node 322 has a reference count of "1," leaf node 324 has a reference count of "1," leaf node 326 has a reference count of "1," leaf node 328 has a reference count of "1," leaf node 330 has a reference count of "2," and leaf node 332 has a reference count of "1."

It is possible that a plurality of file metadata structures include leaf nodes that store the same brick identifier. For example, a plurality of file metadata structures corresponding to files included in a backup snapshot may include leaf nodes that store the same brick identifier. In another example, one or more file metadata structures corresponding to files included in a backup snapshot and one or more file metadata structures corresponding to files generated by a storage cluster may include leaf nodes that store the same brick identifier. In yet another example a plurality of file metadata structures corresponding to files generated by the storage cluster may include leaf nodes that store the same brick identifier.

In order to reduce the amount of storage used by the SSDs to store the metadata associated with a plurality of files, this metadata is deduplicated and duplicate leaf nodes are removed from the SSD. In order to identify potentially duplicate metadata elements, the bottom two levels of the plurality of file metadata structures stored by the storage cluster are scanned. A plurality of leaf nodes that store the same brick identifier are identified. The bottom two levels of a file metadata structure correspond to a leaf node level and a lowest intermediate node level, i.e., the nodes that reference the leaf nodes included in the leaf node level. The leaf nodes that store the same brick identifier may be associated with different files and/or different versions of the same file.

A reference count is maintained for a leaf node, which indicates a number of other nodes that reference the leaf node, e.g., that include a pointer to the leaf node. A leaf node storing the same brick identifier as one or more other leaf nodes and having the highest reference count is identified. For the leaf nodes that store the same brick identifier, the leaf node having the highest reference count is selected and retained, and any the parent node(s) associated with the one or more leaf nodes not having the highest reference count is modified to reference the leaf node having the highest reference. The one or more leaf nodes not having the highest reference count are deleted. Retaining the leaf node with the highest reference count reduces the number of writes needed by the processors of the storage cluster to deduplicate the metadata associated with a plurality of files.

Besides the file metadata structures shown in tree data structure 380, a storage system may store one or more other independent file metadata structures having leaf nodes that store the value "Brick 5." An independent file metadata structure is a file metadata structure that does not include one or more references to one or more other file metadata structures. For example, an independent file metadata structure may correspond to a file generated by the storage system. For an independent file metadata structure, the reference count for a leaf node storing the value "Brick 5" would be "1." When the storage system performs a filesystem metadata deduplication process, for an independent file metadata structure, the parent node of the leaf node storing the value "Brick 5" may be modified to reference leaf node 330 because leaf node 330 has a higher reference count and the leaf node storing the value "Brick 5" may be deleted. As explained above, retaining the leaf node with the highest reference count (leaf node 330 in this example) reduces the number of writes needed by the processors of the storage system to deduplicate the metadata associated with a plurality of files.

Figure 4A:
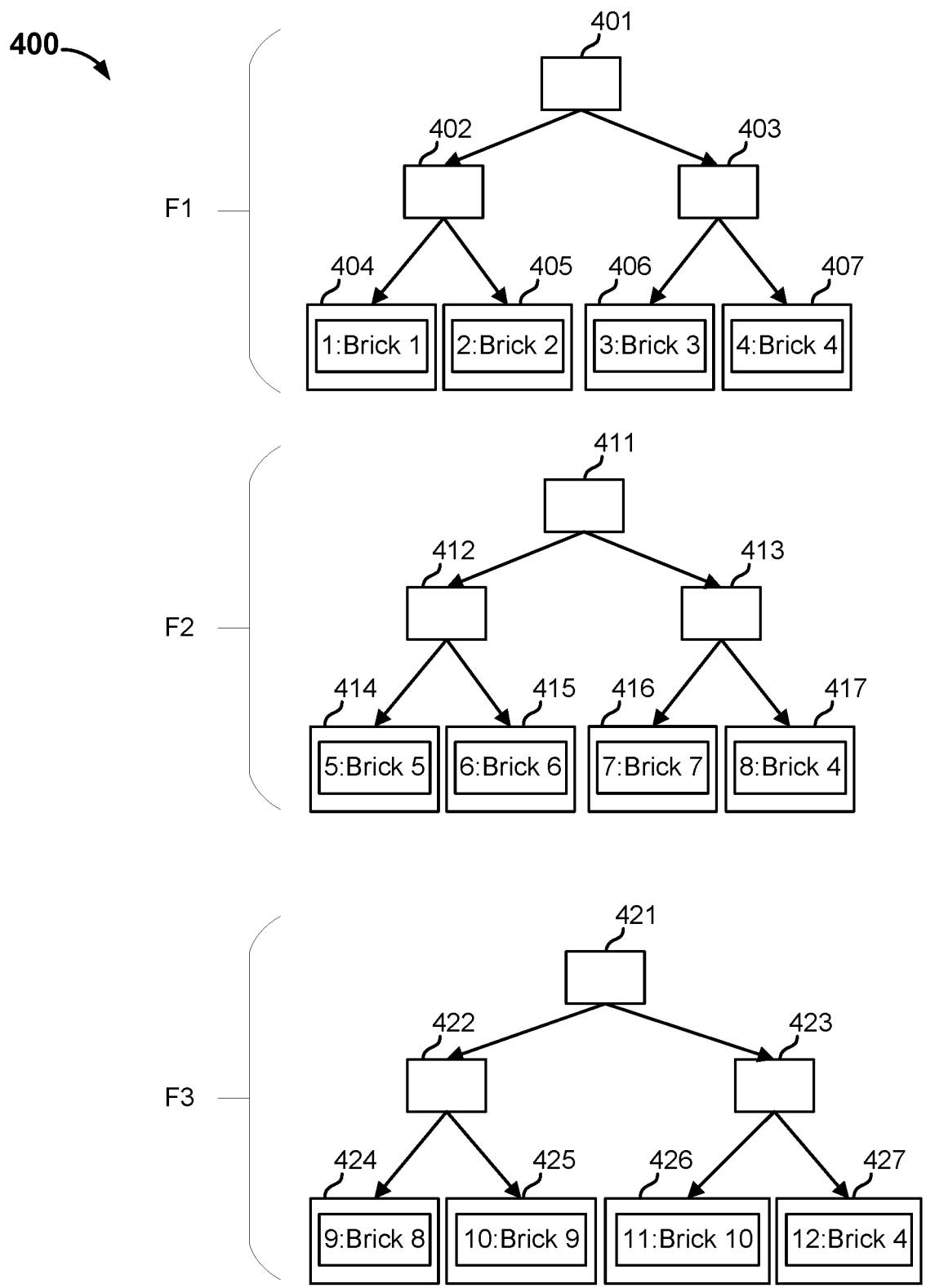
FIG. 4A is a block diagram illustrating an example of duplicate metadata in accordance with some embodiments.

FIG. 4A is a block diagram illustrating an example of duplicate metadata in accordance with some embodiments. In the example shown, file metadata structures 400 include a file metadata structure corresponding to a first file F1, a second file metadata structure corresponding to a second file F2, and a third file metadata structure corresponding to a third file F3.

The first file metadata structure corresponding to a first file F1 is comprised of root node 401, intermediate nodes 402, 403, and leaf nodes 404, 405, 406, 407. Leaf node 404 stores the value "Brick 1," leaf node 405 stores the value "Brick 2," leaf node 406 stores the value "Brick 3," and leaf node 407 stores the value "Brick 4."

The second file metadata structure corresponding to a second file F2 is comprised of root node 411, intermediate nodes 412, 413, and leaf nodes 414, 415, 416, 417. Leaf node 414 stores the value "Brick 5," leaf node 415 stores the value "Brick 6," leaf node 416 stores the value "Brick 7," and leaf node 417 stores the value "Brick 4."

The third file metadata structure corresponding to a third file F3 is comprised of root node 421, intermediate nodes 422, 423, and leaf nodes 424, 425, 426, 427. Leaf node 424 stores the value "Brick 8," leaf node 425 stores the value "Brick 9," leaf node 426 stores the value "Brick 10," and leaf node 427 stores the value "Brick 4."

In the example shown, the file metadata structures corresponding to files F1, F2, F3 each include a leaf node that stores the value "Brick 4." Even though leaf nodes 407, 417, 427 have different node IDs and different TreeIDs, they are duplicate leaf nodes because they store the same value. Storing multiple leaf nodes that reference the same data brick is an inefficient use of storage. The amount of storage needed to store the file metadata structures corresponding to files F1, F2, F3 may be reduced by deduplicating the metadata associated with files F1, F2, F3.

Figure 4B:
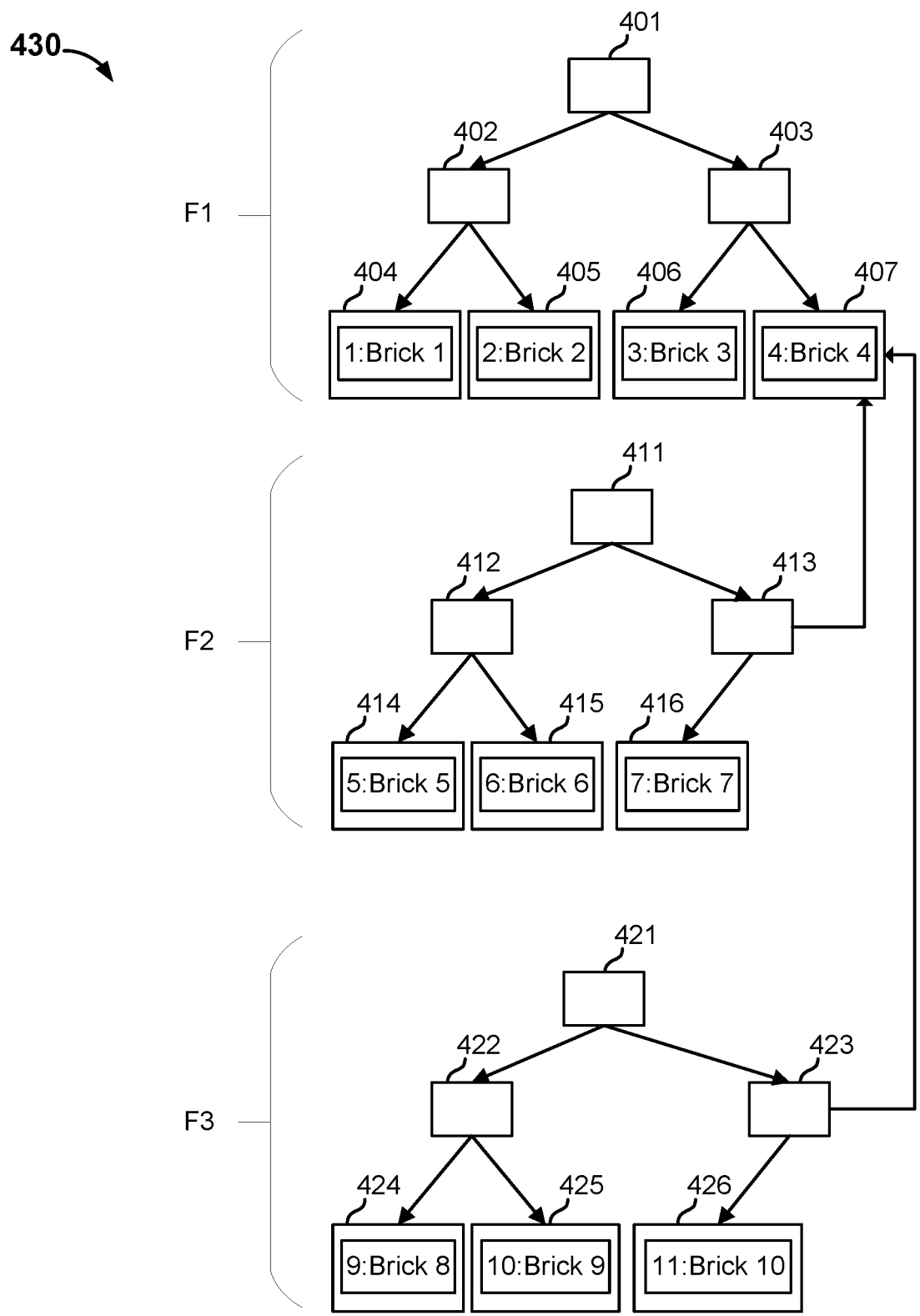
FIG. 4B is a block diagram illustrating an example of deduplicating metadata in accordance with some embodiments.

FIG. 4B is a block diagram illustrating an example of deduplicating metadata in accordance with some embodiments. In the example shown, file metadata structures 430 include a file metadata structure corresponding to a first file F1, a second file metadata structure corresponding to a second file F2, and a third file metadata structure corresponding to a third file F3.

In FIG. 4A, the file metadata structures corresponding to files F1, F2, F3 each previously included a leaf node that reference the value "Brick 4." The metadata associated with a plurality of files may be deduplicated by scanning the bottom two levels of the file metadata structures to identify any leaf nodes that reference the same value (e.g., brick identifier) and the parent nodes of the leaf nodes that reference the same value.

In some embodiments, the metadata associated with a plurality of files is deduplicated in part by determining instances of a leaf node storing the same value as one or more other leaf nodes. The instance having the highest reference count is selected and retained, and the parent nodes associated with leaf nodes not having the highest reference count are modified to reference the leaf node having the highest reference count. The instances of the leaf node not having the highest reference count are deleted.

In other examples, a plurality of instances storing the same value have the same reference count, i.e., there is no single leaf node having the highest reference count. For these examples the metadata associated with a plurality of files is deduplicated by selecting and retaining one of the instances, and the parent nodes associated with one or more non-selected instances are modified to reference the selected instance of the leaf node. The non-selected instances are deleted.

In the example shown, leaf nodes (or leaf node instances) 407, 417, 427 have the same reference count. Leaf node 407 was selected as the leaf node to retain while the parent of leaf node 417, i.e., intermediate node 413 and the parent of leaf node 427, i.e., intermediate node 427 were modified to reference leaf node 407 instead of referencing leaf node 417 and leaf node 427, respectively. Leaf nodes 417, 427 were deleted after their parent leaf nodes were modified to reference the selected node.

Leaf node 407 may have an associated TreeID. The TreeID indicates a file metadata structure that has ownership over the node, i.e., the original file to which the node is associated. The TreeID of leaf node 407 may be the same as the TreeID of root node 401, in which case the value stored by leaf node 407 may be modified without having to create a new leaf node. In the event the TreeID of leaf node 407 is different than the TreeID of root node 401, the value stored by leaf node 407 may be modified by creating a new leaf node, such as depicted in FIG. 3C.

Problems arise when nodes are shared between file metadata structures because the value stored by a leaf node is now associated with a plurality of file metadata structures. A change to a leaf node associated with a first file metadata structure corresponding to a first file may not apply to the one or more other file metadata structures corresponding to one or more other files that share the leaf node. In the example shown, in the event leaf node 407 and root node 401 have the same TreeID, so the value associated with leaf node 407 may be modified without having to create a new leaf node. However, a modification to the file metadata structure corresponding to file F1 also causes changes to file metadata structures corresponding to files F2 and F3. To prevent this from happening, in the event the file that has ownership over the leaf node (e.g., the TreeID of the leaf node matches the TreeID of the root node) is modified such that the leaf node stores a different value and the leaf node is shared by a plurality of file metadata structures, the file metadata structure is modified as if the TreeID of the leaf node does not match the TreeID of the root node, for example as depicted in FIG. 3C. A new leaf node may be generated, and the new leaf node may store the modified value even though the TreeID of the node matches the TreeID of the root node. The value stored by a leaf node shared between file metadata structures may be modified to include a value that indicates that a new leaf node needs to be created to modify the value stored by the leaf node. This may prevent a change to a first file from also applying to one or more other files that share the leaf node.

Figure 4C:
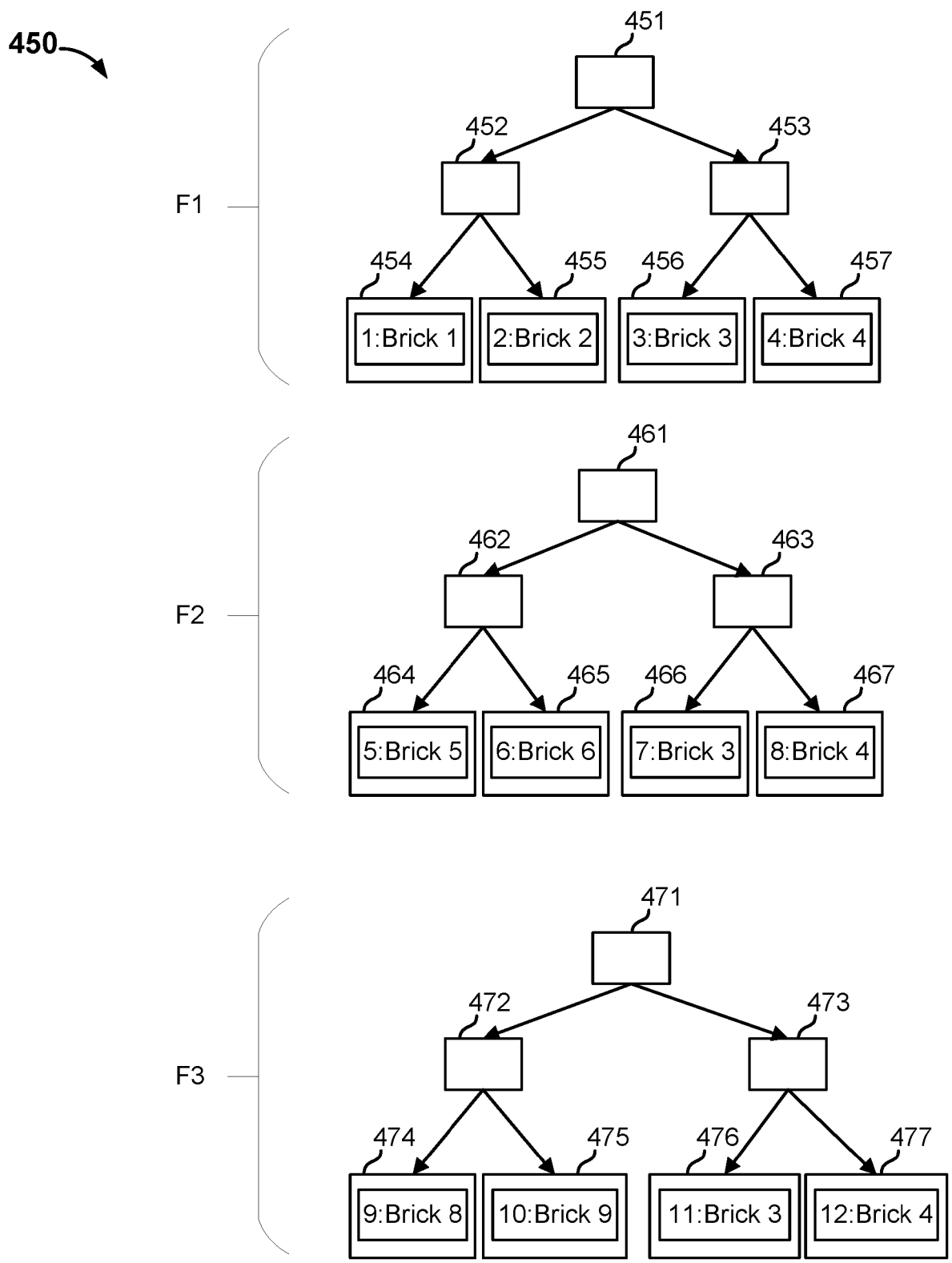
FIG. 4C is a block diagram illustrating an example of duplicative metadata in accordance with some embodiments.

FIG. 4C is a block diagram illustrating an example of duplicate metadata in accordance with a further example, in which file metadata structures 450 include a file metadata structure corresponding to a first file F1, a second file metadata structure corresponding to a second file F2, and a third file metadata structure corresponding to a third file F3.

The first file metadata structure corresponding to a first file F1 is comprised of root node 451, intermediate nodes 452, 453, and leaf nodes 454, 455, 456, 457. Leaf node 454 stores the value "Brick 1," leaf node 455 stores the value "Brick 2," leaf node 456 stores the value "Brick 3," and leaf node 457 stores the value "Brick 4."

The second file metadata structure corresponding to a second file F2 is comprised of root node 461, intermediate nodes 462, 463, and leaf nodes 464, 465, 466, 467. Leaf node 464 stores the value "Brick 5," leaf node 465 stores the value "Brick 6," leaf node 466 stores the value "Brick 3," and leaf node 467 stores the value "Brick 4."

The third file metadata structure corresponding to a third file F3 is comprised of root node 471, intermediate nodes 472, 473, and leaf nodes 474, 475, 476, 477. Leaf node 474 stores the value "Brick 8," leaf node 475 stores the value "Brick 9," leaf node 476 stores the value "Brick 3," and leaf node 477 stores the value "Brick 4."

The metadata associated with a plurality of files may be deduplicated by removing duplicate portions of a file metadata structure. The leaf nodes associated with a portion of a file metadata structure may store a particular sequence of values (e.g., brick identifiers). For the example of FIG. 4C, the file metadata structure corresponding to a first file F1 includes four leaf nodes where a first leaf node stores a brick identifier of "1," a second leaf node stores a brick identifier of "2," a third leaf node stores a brick identifier of "3," and a fourth leaf node stores a brick identifier of "4." In this example, the particular sequence of values for the file metadata structure corresponding to the first file is "1234." The particular sequence of values for the file metadata structure corresponding to the second file F2 is "5634." The particular sequence of values for the file metadata structure corresponding to the third file is "8934." The particular sequence of values may be referred to as a "tree fingerprint."

A breadth level search of leaf node level for each of the plurality of file metadata structures may be performed to identify corresponding tree fingerprints associated with the file metadata structures. In some embodiments, a portion of the tree fingerprint associated with a first file metadata structure is the same as a portion of the tree fingerprint associated with one or more other file metadata structures. In the FIG. 4C, the portion of the first file metadata structure that includes leaf nodes 456, 457 is the same as the portion of the second file metadata structure that includes leaf nodes 466, 467 and is the same as the portion of the third file metadata structure that includes leaf nodes 476, 477.

Figure 4D:
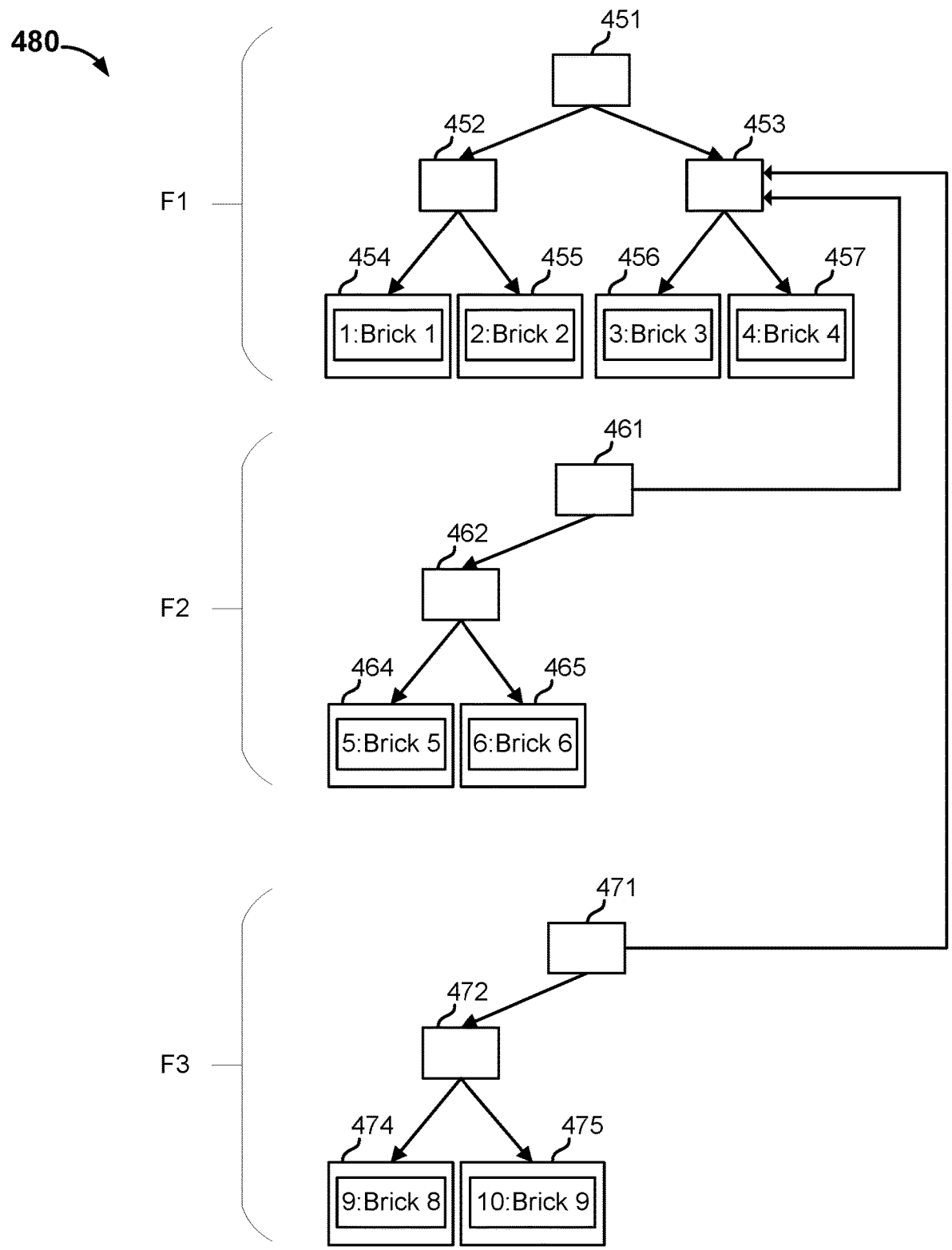
FIG. 4D is a block diagram illustrating an example of deduplicating metadata in accordance with some embodiments.

FIG. 4D is a block diagram illustrating an example of deduplicating metadata for the example of FIG. 4C. In the example shown, the tree fingerprints associated with the first, second, and third file metadata structures share a common sequence of values, specifically the common sequence of values is "34". A common metadata element may be a node that includes a direct or indirect reference to the leaf nodes associated with the common sequence and does not include a direct or indirect reference to leaf nodes that are not associated with the common sequence. A node may include a direct reference to the leaf nodes associated with the common sequence in the event the node is one level above the leaf nodes associated with the common sequence. A node may include an indirect reference to the leaf nodes associated with the common sequence in the event the node is two or more levels above the leaf nodes associated with the common sequence.

In this example, the common node for the leaf nodes included in the common sequence for the first file metadata structure corresponding to the first file F1 was intermediate node 453. The common node for the leaf nodes included in the common sequence for the second file metadata structure corresponding to the second file F2 was intermediate node 463. The common node for the leaf nodes included in the common sequence for the third file metadata structure corresponding to the third file F3 was intermediate node 473.

A reference count associated with corresponding common nodes is determined, and the common node having the highest reference identified. In some embodiments, for the plurality of common nodes associated with the common sequence, the common node having the highest reference count is selected and retained. The corresponding parent node(s) of the other common nodes is/are modified to reference the common node having the highest reference count, the non-selected common nodes are deleted, and the nodes directly or indirectly referenced by the non-selected common nodes are deleted. Retaining the common node with the highest number of references may reduce the number of writes needed by the processors of the storage cluster to deduplicate the metadata associated with a plurality of files.

In other examples, a plurality of common nodes have the same reference count, i.e., there is no single common node having the highest reference count. In this case the metadata associated with a plurality of files is deduplicated by selecting and retaining one of the common nodes, modifying the parent nodes associated with one or more non-selected common nodes to reference the selected common node and deleting the nodes referenced by the one or more non-selected common nodes.

In this example, intermediate nodes 453, 463, 473 had the same reference count. Intermediate node 453 was selected as the leaf node to retain while the parent of intermediate node 463, i.e., root node 461 and the parent of leaf node 473, i.e., root node 471 were modified to reference intermediate node 453 instead of referencing intermediate node 463 and intermediate node 473, respectively. Intermediate nodes 463, 473 and leaf nodes 466, 467, 476, 477 were deleted after root nodes 461, 471 were modified to reference the selected node.

Figure 5:
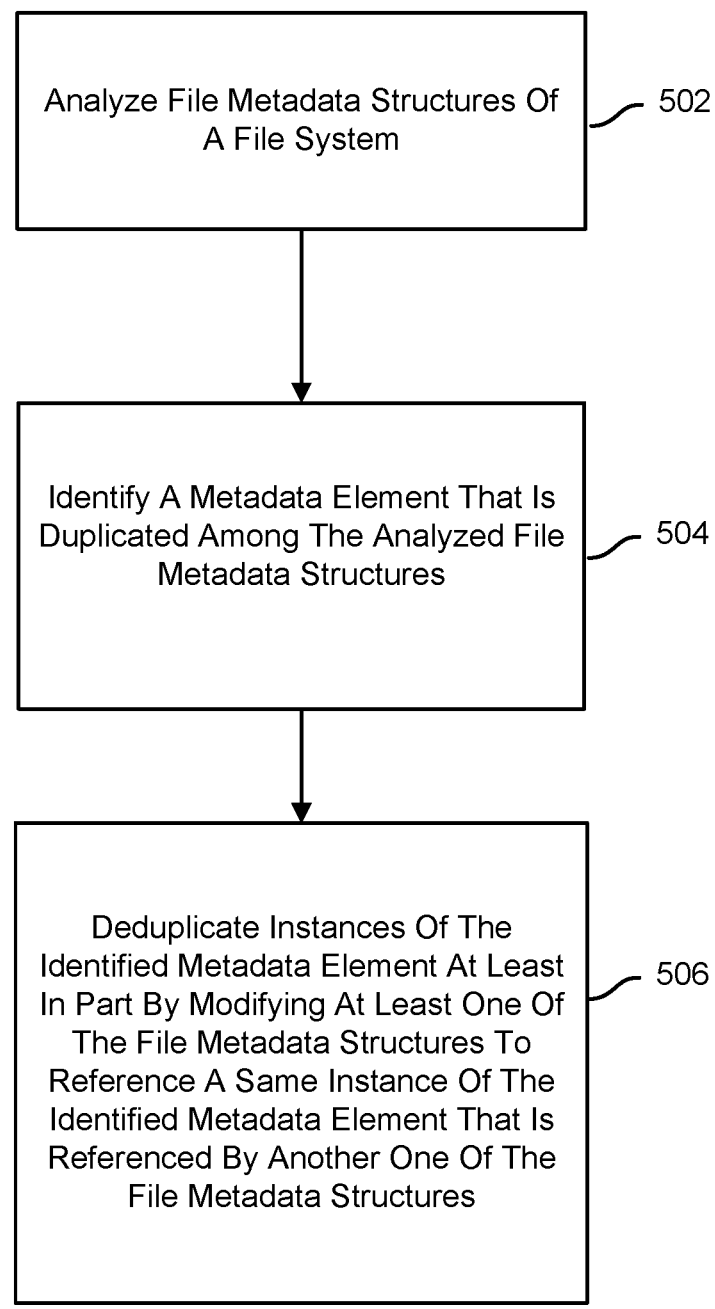
FIG. 5 is a flow chart illustrating a process for deduplicating the metadata associated with a plurality of files in accordance with some embodiments.

FIG. 5 is a flow chart illustrating a process for deduplicating metadata associated with a plurality of files in accordance with some embodiments. In the example shown, process 500 may be implemented by a storage cluster, such as storage cluster 112.

At 502, a plurality of file metadata structures of a file system are analyzed. As will be appreciated from the foregoing examples, a storage cluster may store a plurality of files and organize the metadata associated with the plurality of files using a tree data structure. Some of the files stored by the storage cluster may correspond to files that were backed up from a primary system to the storage cluster. Others of the files stored by the storage cluster may correspond to files that were generated by the storage cluster.

The metadata associated with a file may be organized using a tree data structure and be referred to as a "file metadata tree" or "file metadata structure." Each of the file metadata structures comprises a corresponding plurality of metadata elements. For example, a file metadata structure includes a root node, one or more levels of one or more intermediate nodes, and a plurality of leaf nodes. A leaf node of a file metadata structure stores a KVP. The value of the KVP may be a brick identifier associated with one or more data chunks of the file. The metadata associated with a plurality of files stored by the storage cluster may be stored in the SSDs of the storage cluster.

At 504, a metadata element that is duplicated among the plurality of file metadata structures is identified. For example, a storage cluster may be storing duplicate metadata in the event a plurality of leaf nodes store the same value, and/or the storage cluster may identify a plurality of file metadata structures that include metadata elements (e.g., leaf nodes) that store the same value. A reference count is determined for each metadata element that stores the same value as one or more other metadata elements. The reference count indicates a number of other metadata elements that reference the metadata element, e.g., include a pointer to the leaf node. The metadata element storing the same value as one or more other metadata elements and having the highest reference count is identified.

At 506, the identified metadata element is deduplicated by modifying at least one of the plurality of file metadata structures to reference a same instance of the metadata element that is referenced by another one of the plurality of the file metadata structures.

For instances of a metadata element that store the same value, the instance having the highest reference count is selected and retained, and the parent metadata element associated with instances not having the highest reference count are modified to reference the instance of the metadata element having the highest reference count. The instances of the metadata element not having the highest reference count are then deleted. Retaining the instance with the highest reference count reduces the number of writes needed by the processors of the storage cluster to deduplicate the metadata associated with a plurality of files.

For instances of the metadata element that have the same reference count, i.e., when no single instance of the metadata element has the highest reference count, the metadata associated with the plurality of files is deduplicated by selecting and retaining one of the instances, and modifying the parent metadata element associated with one or more non-selected instances to reference the selected instance of the metadata element. The one or more non-selected instances of the metadata element are deleted.

Figure 6:
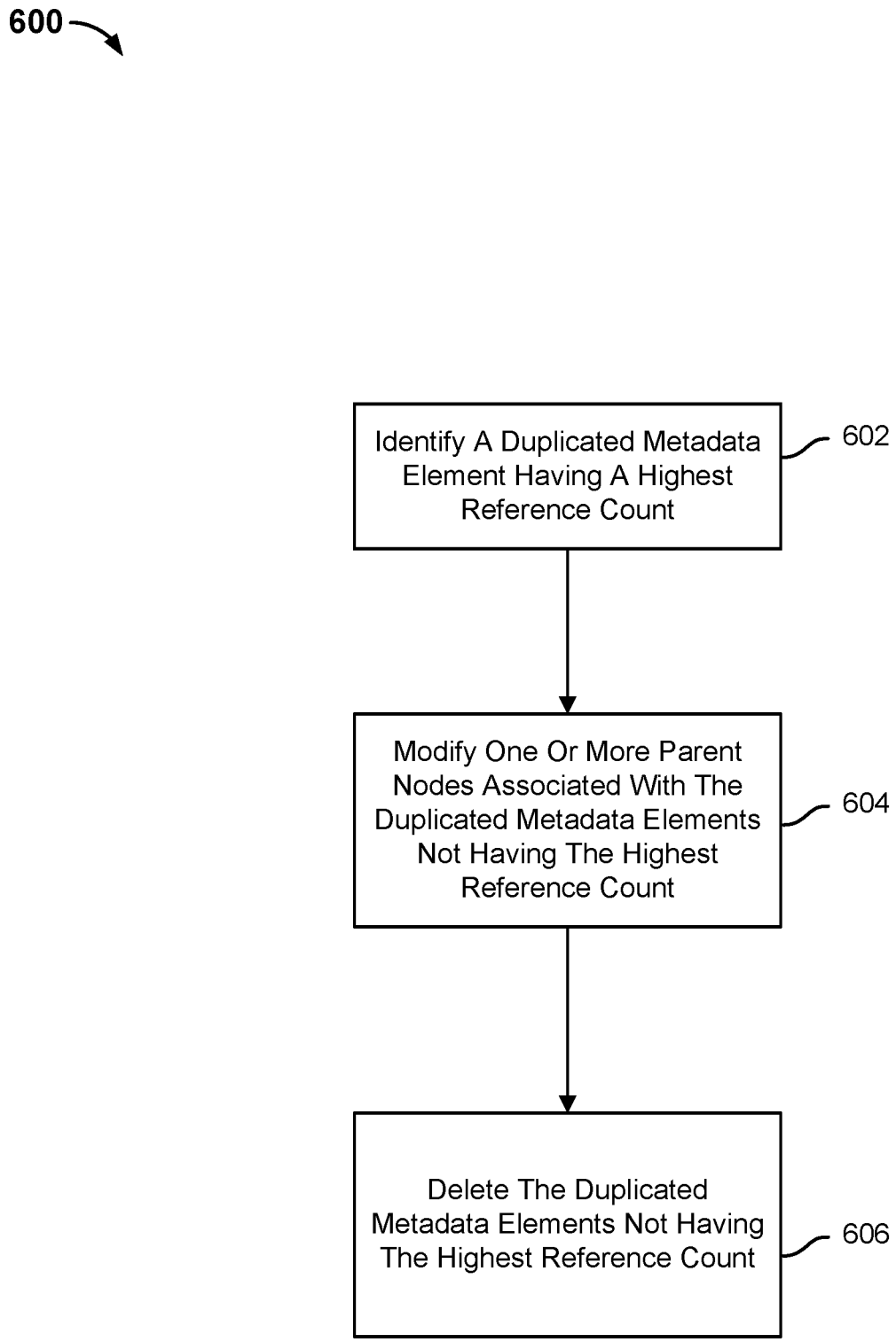
FIG. 6 is a flow chart illustrating a process for deduplicating metadata elements in accordance with some embodiments.

FIG. 6 is a flow chart illustrating a process for deduplicating metadata elements in accordance with some embodiments. In the example shown, process 600 may be implemented by a storage cluster, such as storage cluster 112. In some embodiments, process 600 is implemented to perform some or all of step 506 of process 500.

At 602, a duplicated metadata element having a highest reference count is identified. A plurality of metadata elements may store the same value, e.g., a brick identifier. A reference count may be determined for each metadata element that stores the same value. The reference count may indicate a number of other metadata elements (e.g., nodes) that reference the metadata element that stores the same value as one or more other metadata elements. The metadata element storing the same value as one or more other metadata elements and having the highest reference count is identified.

The identified metadata element may be associated with a file that was backed up from a primary system to a storage cluster. In other embodiments, the duplicated metadata element is associated with a file that was generated by the storage cluster. Regardless of the file source, the storage cluster may be configured to organize the metadata associated with a file using a tree data structure.

In the event the identified metadata element is associated with a file that was backed up from a primary system to a storage cluster, the file metadata structure that includes the identified metadata element may be associated with one or more other file metadata structures, i.e., one or more nodes of the one or more other file metadata structures may include one or more references to one or more nodes of the file metadata structure that includes the identified metadata element. Each version of a file that is backed up from a primary system to the storage cluster may have an associated file metadata structure. The reference count may be greater than one when multiple versions of a file are backed up from a primary system to the storage cluster.

In other embodiments, a file metadata structure is associated with a file that was generated by the storage cluster. The storage cluster may be used to store a plurality of versions of the file generated by the storage cluster. A file metadata structure may be generated for each version of the file generated by the user associated with the storage cluster; however, each file metadata structure may be independent of the one or more other file metadata structures corresponding to different versions of the file generated by the storage cluster. A duplicated metadata element included in a file metadata structure corresponding to a file generated by the storage cluster has a reference count of one because the file metadata structure is independent of the one or more other file metadata structures corresponding to different versions of the file generated by the storage cluster, i.e., a node of one of the other file metadata structures does not include a reference to a node of the file metadata structure that includes the duplicated metadata element.

At 604, the one or more parent metadata elements associated with duplicated metadata elements not having the highest reference count are modified. The bottom two levels of a plurality of file metadata structures may be scanned to identify duplicated metadata elements and corresponding parent metadata elements of the duplicated metadata elements, i.e., a node that includes a direct reference to the duplicated metadata element. The one or more corresponding parent metadata elements associated with the one or more duplicated metadata elements not having the highest reference count may be modified to reference the duplicated metadata element having the highest reference count. For example, a parent metadata element may be modified to include a pointer to the duplicated metadata element having the highest reference count.

At 606, the one or more duplicated metadata elements not having the highest reference count are deleted. Retaining the metadata element with the highest reference count may reduce the number of writes needed by the processors of the storage cluster to deduplicate the metadata associated with a plurality of files. For example, two leaf nodes may store the same brick identifier. The first leaf node may have a reference count of four and the second leaf node may have a reference count of one. Modifying the parent node of the second leaf node to reference the first leaf node would require a single write operation whereas modifying the parent nodes of the first leaf node to reference the second leaf node would require four separate write operations.

Figure 7:
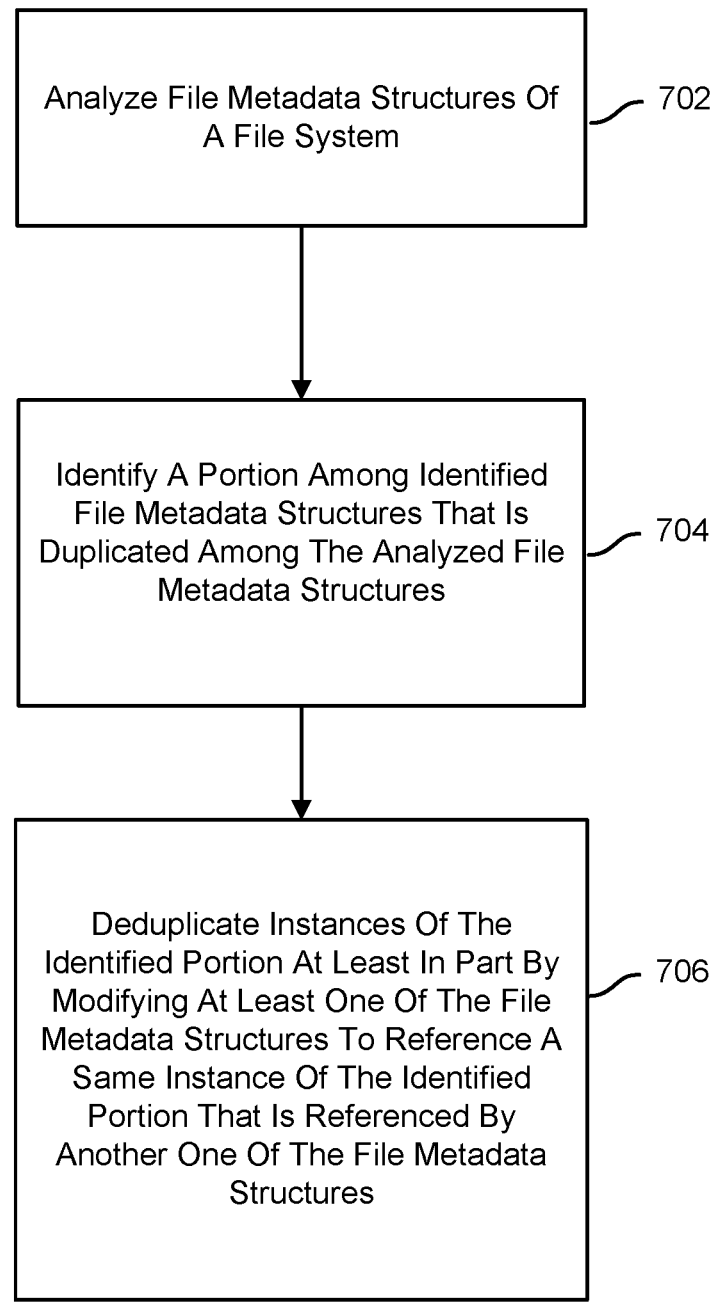
FIG. 7 is a flow chart illustrating a process for deduplicating the metadata associated with a plurality of files in accordance with some embodiments.

FIG. 7 is a flow chart illustrating a process for deduplicating the metadata associated with a plurality of files in accordance with some embodiments. In the example shown, process 700 may be implemented by a storage cluster, such as storage cluster 112.

At 702, a plurality of file metadata structures of a file system are analyzed. A storage cluster may store a plurality of files and organize the metadata associated with the plurality of files using a tree data structure. Some of the files stored by the storage cluster may correspond to files that were backed up from a primary system to the storage cluster. Some of the files stored by the storage cluster may correspond to files that were generated by the storage cluster.

The metadata associated with a file may be organized using a tree data structure and be referred to as a "file metadata tree" or "file metadata structure." A file metadata structure may include a root node, one or more levels of one or more intermediate nodes, and a plurality of leaf nodes. Each node of the metadata structure may be referred to as a "metadata element." A leaf node of a file metadata structure may store a KVP. The value of the KVP may be a brick identifier associated with one or more data chunks of the file. The metadata associated with a plurality of files stored by the storage cluster may be stored in the SSDs of the storage cluster.

The plurality of files stored in the storage cluster may include duplicate data chunks. The duplicate data chunks may be deduplicated to reduce the amount of storage used to store the plurality of files. This frees up storage space for the HDDs and SSDs to store the data associated with one or more other files. Although the data associated with a file may be deduplicated, the storage cluster may store duplicate metadata associated with the plurality of files. For example, a storage cluster may store a plurality of file metadata structures that include corresponding metadata elements that store the same value (e.g., the same brick identifier). The amount of storage used by the SSDs to store the metadata associated with a plurality of files may be reduced by deduplicating the metadata associated with a plurality of files. The bottom two levels of the plurality of file metadata structures stored by the storage cluster may be scanned to determine whether the storage cluster is storing duplicate metadata. A storage cluster may be storing duplicate metadata in the event a plurality of metadata elements store the same value. The storage cluster may identify a plurality of file metadata structures that include metadata elements that store the same value.

At 704, portions of the file metadata structure that are duplicated among an identified plurality of the file metadata structures are identified. Storage cluster 112 may perform a breadth level search of the leaf node level for each of the plurality of file metadata structures to identify corresponding tree fingerprints associated with the file metadata structures. In some embodiments, a portion of the tree fingerprint associated with a first file metadata structure is the same as a portion of the tree fingerprint associated with one or more other file metadata structures. For example, the tree fingerprint associated with a first file metadata structure may be "1234," the tree fingerprint associated with a second file metadata structure may be "5634," and the tree fingerprint associated with a third file metadata structure may be "8934." The tree fingerprints associated with the first, second, and third file metadata structures share a common sequence of values (e.g., brick identifiers). In this example, the common sequence of brick identifiers is "34." A common metadata element (also referred to as a common node) associated with the common sequence may be identified. A common metadata element may be a node that includes a direct or indirect reference to the leaf nodes associated with the common sequence and does not include a direct or indirect reference to leaf nodes that are not associated with the common sequence. A node may include a direct reference to the leaf nodes associated with the common sequence in the event the node is one level above the leaf nodes associated with the common sequence. A node may include an indirect reference to the leaf nodes associated with the common sequence in the event the node is two or more levels above the leaf nodes associated with the common sequence.

At 706, the identified portions of the file metadata structures are deduplicated by modifying at least one of the plurality of the file metadata structures to reference a same instance of the identified portion that is referenced by another one of the plurality of the file metadata structures. When the identified portions are defined by a common sequence of values, such as brick identifiers "34" in the example above, a so-called common metadata element (also referred to herein as a common node) associated with the common sequence represents the identified portion.

A reference count associated with corresponding common nodes may be determined. The common node having the highest reference count is identified, selected and retained, and any parent metadata element of the other common nodes are modified to reference the common node having the highest reference count. The non-selected common nodes are deleted, and the nodes directly or indirectly referenced by the non-selected common nodes are deleted. Retaining the common node with the highest number of references may reduce the number of writes needed by the processors of the storage cluster to deduplicate the metadata associated with a plurality of files.

In other examples, a plurality of common nodes have the same reference count, i.e., there is no single common node having the highest reference count. The metadata associated with a plurality of files is deduplicated in part by selecting and retaining one of the common nodes while the parent nodes associated with one or more non-selected common nodes are modified to reference the selected common node and the nodes referenced by the one or more non-selected common nodes are deleted.

In some embodiments, a single common node associated with a common sequence of values does not exist. For example, a first file metadata structure may have a tree fingerprint of "12345678" and a second file metadata structure may have a tree fingerprint of "92345678." The common sequence of values in this example is "2345678." A first portion of the first file metadata structure may be associated with metadata elements having a sequence of values of "1234" and a second portion of the first file metadata structure may be associated with metadata elements having a sequence of values of "5678." The first portion of the first file metadata structure may be associated with a first intermediate node and the second portion of the first file metadata structure may be associated with a second intermediate node where the first and second intermediate nodes are associated with different branches of the first file metadata structure. A first portion of the second file metadata structure may be associated with metadata elements having a sequence of values of "9234" and a second portion of the second file metadata structure may be associated with metadata elements having a sequence of values of "5678." The first portion of the second file metadata structure may be associated with a first intermediate node and the second portion of the second file metadata structure may be associated with a second intermediate node where the first and second intermediate nodes are associated with different branches of the second file metadata structure.

In this case the common sequence of brick identifiers may be divided into a plurality of portions and corresponding nodes for the plurality of portions may be determined. For example, a common node for the sequence of values of "234" may be determined and a common node for the sequence of values of "5678" may be determined. The metadata associated with the file metadata structures may be deduplicated based on the determined common nodes. In the event the determined common nodes includes one or more references to one or more nodes that are not part of the common sequence of values, the metadata associated with the plurality of files may be deduplicated at the leaf node level as described above.

Figure 8:
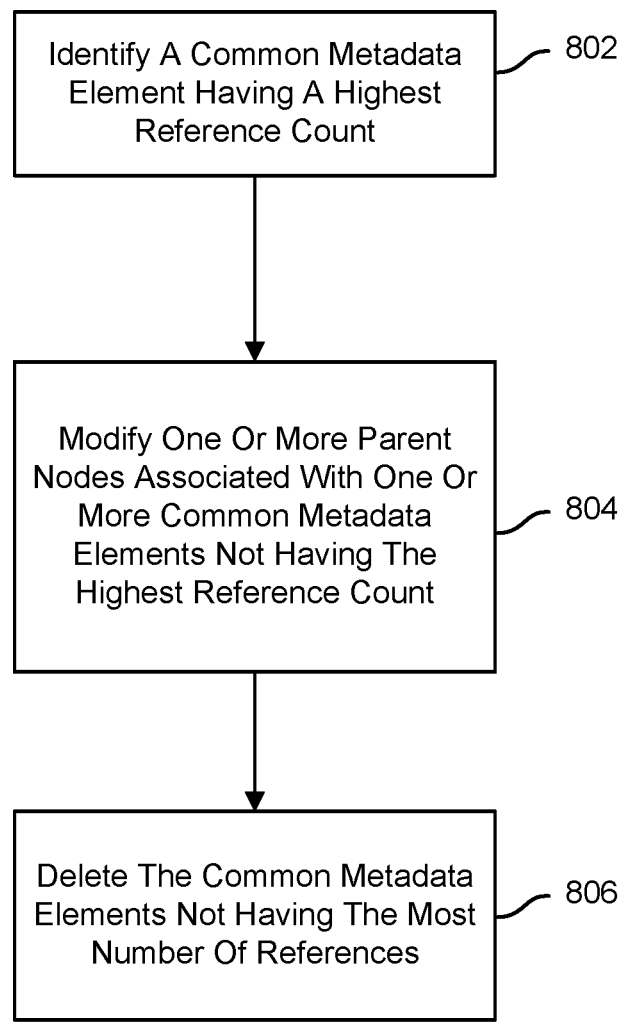
FIG. 8 is a flow chart illustrating a process for deduplicating metadata elements in accordance with some embodiments.

FIG. 8 is a flow chart illustrating a process for deduplicating metadata elements in accordance with some embodiments. In the example shown, process 800 may be implemented by a storage cluster, such as storage cluster 112. In some embodiments, process 800 is implemented to perform some or all of step 706 of process 700.

As explained above, a common sequence of values may be shared by a plurality of file metadata structures. A so-called common metadata element, or common node, is one that has the common sequence of values. A common node may be a node that includes a direct or indirect reference to the leaf nodes associated with the common sequence and does not include a direct or indirect reference to leaf nodes that are not associated with the common sequence. At 802, a common metadata element (common node) having a highest reference count is identified. The reference count indicates a number of other nodes that reference the common node, e.g., include a pointer to the common node.

The common sequence may be associated with a file that was backed up from a primary system to a storage cluster. In other examples, the common sequence is associated with a file that was generated by the storage cluster. Regardless of the file source, the storage cluster may be configured to organize the metadata associated with a file using a tree data structure.

In the event the common sequence is associated with a file that was backed up from a primary system to a storage cluster, the file metadata structure that includes the common sequence may be associated with one or more other file metadata structures, i.e., one or more nodes of the one or more other file metadata structures may include one or more references to one or more nodes of the file metadata structure that includes the common sequence. Each version of a file that is backed up from a primary system to the storage cluster may have an associated file metadata structure. A common metadata element that indirectly or directly references the common sequence may have a reference count that is greater than one in the event the common metadata element is associated with multiple versions of a file that was backed up from a primary system to the storage cluster.

In other examples, a file metadata structure is associated with a file that was generated by the storage cluster. The storage cluster may be used to store a plurality of versions of the file generated by the storage cluster. A file metadata structure may be generated for each version of the file generated by the user associated with the storage cluster; however, each file metadata structure may be independent of the one or more other file metadata structures corresponding to different versions of the file generated by the storage cluster. A common metadata element that directly or indirectly references the common sequence included in a file metadata structure corresponding to a file generated by the storage cluster has a reference count of one because the file metadata structure is independent of the one or more other file metadata structures corresponding to different versions of the file generated by the storage cluster, i.e., a node of one of the other file metadata structures does not include a reference to a node of the file metadata structure that includes the common sequence.

At 804, the one or more parent metadata elements associated with one or more common metadata elements not having the highest reference count are modified. The plurality of file metadata structures that include the common sequence may be scanned to identify corresponding common metadata elements that indirectly or directly reference the common sequence. The corresponding parent metadata elements of the common metadata elements, i.e., a node that includes a direct reference to common metadata element, may be determined. The one or more corresponding parent metadata elements associated with the one or more common metadata elements not having the highest reference count may be modified to reference the common metadata element having the highest reference count. For example, a parent metadata element may be modified to include a pointer to the common metadata element having the highest reference count.

At 806, the one or more common metadata elements not having the highest number of references are deleted. Retaining the common metadata element with the highest number of references may reduce the number of writes needed by the processors of the storage cluster to deduplicate the metadata associated with a plurality of files. For example, two metadata elements may have the same common sequence, and may be referred to as instances of a common metadata element. The first instance of the metadata element may have a reference count of four and the second instance of the metadata element may have a reference count of one. The parent metadata element of the second instance of the metadata element is then modified to reference the first instance of the metadata element. This is efficient because it requires only a single write operation, whereas modifying the parent metadata element of the first instance of the metadata element to reference the second instance of the metadata element would require four separate write operations. Metadata elements referenced by the second common metadata element can also be deleted, if these are referenced by the retained first instance of the common metadata element.

In the above embodiments, deduplication of metadata associated with a plurality of files has been described with regards to values held by individual leaf nodes of a tree structure, in particular with regards to individual leaf nodes of a tree structure (FIGS. 5 and 6), a plurality of leaf nodes of a tree structure (FIGS. 7 and 8), and intermediate nodes within a tree structure. It is to be appreciated that the methods described herein can also be used to deduplicate metadata across different tree structures by deduplicating values, e.g. identifiers of one or more data bricks associated with one or more data chunks held by leaf node(s) of such different tree structures.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
analyzing file metadata structures of a file system, wherein each of the file metadata structures includes a plurality of metadata elements;
identifying a metadata element of the plurality of metadata elements that is duplicated among the analyzed file metadata structures, wherein instances of the identified metadata element reference a same data chunk, wherein the instances of the identified metadata element at least include a first leaf node of a first file metadata structure of the file metadata structures and a second leaf node of a second file metadata structure of the file metadata structures; and
deduplicating the instances of the identified metadata element at least in part by modifying the second file metadata structure to reference the first leaf node of the first file metadata structure of the file metadata structures instead of referencing the same data chunk,
wherein modifying the second file metadata structure to reference the first leaf node of the first file metadata structure includes modifying a parent metadata element of the second leaf node of the second file metadata structure to reference the first leaf node of the first file metadata structure instead of referencing the second leaf node of the second file metadata structure and deleting the second leaf node of the second file metadata structure, and
wherein the first leaf node of the first file metadata structure is an instance of the identified metadata element among the instances of the identified metadata element having a highest reference count.

2. The method of claim 1, wherein analyzing file metadata structures of the file system comprises scanning a bottom level of the file metadata structures and a level above the bottom level of the file metadata structures.

3. The method of claim 1, wherein at least one of the first file metadata structure and the second file metadata structure corresponds to a file generated by a storage cluster.

4. The method of claim 1, wherein at least one of first file metadata structure and the second file metadata structure corresponds to a file backed up from a primary system to a storage cluster.

5. The method of claim 1, further comprising identifying a plurality of file metadata structures from a set of stored file metadata structures that include the metadata element.

6. The method of claim 1, wherein the metadata element is configured to store a value, wherein at least two of the analyzed file metadata structures include the metadata element that stores the value.

7. The method of claim 1, wherein deduplicating instances of the identified metadata element includes identifying which instance of the identified metadata element has the highest reference count from a plurality of instances of the identified metadata element.

8. The method of claim 7, wherein a reference count indicates a number of one or more other metadata elements that reference the metadata element.

9. The method of claim 1, wherein deduplicating instances of the identified metadata element comprises deleting one or more instances of the identified metadata element not having the highest reference count.

10. The method of claim 9, wherein the one or more instances of the identified metadata element not having the highest reference count are deleted from a solid state disk of a storage cluster.

11. The method of claim 1, wherein the identified metadata element is deduplicated as a background process of a storage cluster.

12. The method of claim 11, wherein the storage cluster is comprised of a plurality of storage nodes, wherein the metadata associated with a plurality of files is stored across the plurality of storage nodes.

13. The method of claim 1, wherein deduplicating instances of the identified metadata element comprises determining a corresponding reference count associated with each instance of the identified metadata element.

14. The method of claim 13, wherein the determined reference count is the same for each instance of the identified metadata element.

15. The method of claim 14, wherein modifying the second file metadata structure includes selecting to reference the first leaf node of the first file metadata structure.

16. A computer program product, the computer program product being embodied in a non-transitory computer readable storage medium and comprising computer instructions for:

analyzing file metadata structures of a file system, wherein each of the file metadata structures includes a plurality of metadata elements;

identifying a metadata element of the plurality of metadata elements that is duplicated among the analyzed file metadata structures, wherein instances of the identified metadata element reference a same data chunk, wherein the instances of the identified metadata element at least include a first leaf node of a first file metadata structure of the file metadata structures and a second leaf node of a second file metadata structure of the file metadata structures; and deduplicating the instances of the identified metadata element at least in part by modifying the second file metadata to reference the first leaf node of the first file metadata structure of the file metadata structures instead of referencing the same data chunk, wherein modifying the second file metadata structure to reference the first leaf node of the first file metadata structure includes modifying a parent metadata element of the second leaf node of the second file metadata structure to reference the first leaf node of the first file metadata structure instead of referencing the second leaf node of the second file metadata structure and deleting the second leaf node of the second file metadata structure, and wherein the first leaf node of the first file metadata structure is an instance of the identified metadata element among the instances of the identified metadata element having a highest reference count.

17. A system, comprising:
a processor configured to:
   analyze file metadata structures of a file system, wherein each of the file metadata structures includes a plurality of metadata elements;
   identify a metadata element of the plurality of metadata elements that is duplicated among the analyzed file metadata structures, wherein instances of the identified metadata element reference a same data chunk, wherein the instances of the identified metadata element at least include a first leaf node of a first file metadata structure of the file metadata structures and a second leaf node of a second file metadata structure of the file metadata structures; and
   deduplicate the instances of the identified metadata element at least in part by modifying the second file metadata structure to reference the first leaf node of the first file metadata structure of the file metadata structures instead of referencing the same data chunk,
      wherein modifying the second file metadata structure to reference the first leaf node of the first file metadata structure includes modifying a parent metadata element of the second leaf node of the second file metadata structure to reference the first leaf node of the first file metadata structure instead of referencing the second leaf node of the second file metadata structure and deleting the second leaf node of the second file metadata structure, and
      wherein the first leaf node of the first file metadata structure is an instance of the identified metadata element among the instances of the identified metadata element having a highest reference count; and
a memory coupled to the processor and configured to provide the processor with instructions.

* * * * *